FILM PROCESSING APPARATUS

INVENTOR.
WILLIAM C. MAYFIELD

BY FOWLER, KNOBBE
& GAMBRELL

ATTORNEYS.

INVENTOR.
WILLIAM C. MAYFIELD
BY FOWLER, KNOBBE & GAMBRELL
ATTORNEYS.

June 18, 1968 W. C. MAYFIELD 3,388,653

FILM PROCESSING APPARATUS

Filed July 1, 1965 11 Sheets-Sheet 3

INVENTOR.
WILLIAM C. MAYFIELD

BY FOWLER, KNOBBE & GAMBRELL

ATTORNEYS.

INVENTOR.
WILLIAM C. MAYFIELD
BY FOWLER, KNOBBE & GAMBRELL
ATTORNEYS.

INVENTOR
WILLIAM C. MAYFIELD
BY FOWLER, KNOBBE & GAMBRELL
ATTORNEYS.

INVENTOR.
WILLIAM C. MAYFIELD
BY FOWLER, KNOBBE & GAMBRELL
ATTORNEYS.

June 18, 1968 W. C. MAYFIELD 3,388,653

FILM PROCESSING APPARATUS

Filed July 1, 1965 11 Sheets-Sheet 7

INVENTOR.
WILLIAM C. MAYFIELD

BY FOWLER, KNOBBE & GAMBRELL

ATTORNEYS.

INVENTOR.
WILLIAM C. MAYFIELD
BY FOWLER, KNOBBE & GAMBRELL
ATTORNEYS.

INVENTOR.
WILLIAM C. MAYFIELD
BY FOWLER, KNOBBE & GAMBRELL
ATTORNEYS.

June 18, 1968 W. C. MAYFIELD 3,388,653

FILM PROCESSING APPARATUS

Filed July 1, 1965 11 Sheets-Sheet 10

INVENTOR.
WILLIAM C. MAYFIELD

BY FOWLER, KNOBBE & GAMBRELL

ATTORNEYS.

INVENTOR.
WILLIAM C. MAYFIELD
BY FOWLER, KNOBBE
& GAMBRELL
ATTORNEYS.

United States Patent Office 3,388,653
Patented June 18, 1968

3,388,653

FILM PROCESSING APPARATUS

William C. Mayfield, 107 N. Hidalgo Ave., Alhambra, Calif. 91801

Filed July 1, 1965, Ser. No. 472,075
5 Claims. (Cl. 95—89)

ABSTRACT OF THE DISCLOSURE

Apparatus for the continuous reversal processing of a film. The apparatus includes an adjustable feed loop rack which has a plurality of rotatable film rollers mounted in spaced relation thereon. The rack is removably mounted in an accumulator cabinet in light-tight relation therewith. The apparatus includes a series of chemical and rinse tanks supported in line on a frame adjacent the accumulator cabinet. These tanks contain either chemicals or rinse water. Each of the chemical tanks is part of a dual conducting wall with a rinse tank. The apparatus is provided with a device for mixing the liquid in each tank by agitation and for replenishing the quantities of chemicals in the chemical tank and water in the rinse tank.

This invention relates to film processing apparatus and, more particularly, to apparatus for continuously processing reversal and negative-positive film.

While automatic film processors for 16 mm., 35 mm. and microfilm are well known in the prior art, most have not been able to reach an effective compromise between size and versatility. Many efforts have been made in connection with prior art film processing apparatus to make them portable but most devices which are truly portable or even relatively small in size do not provide the variety of features necessary in professional film processing apparatus. On the other hand, truly professional film processing apparatus is not only exceedingly expensive, but it occupies great amounts of space and is normally quite heavy.

The present invention overcomes many of the disadvantages of the prior art apparatus of both portable and professional types. The present compact film processor incorporates virtually all of the features required by professional film processing and, at the same time, provides these features in apparatus which takes up a minimum amount of space, which is lightweight and which is relatively easy to move around.

The film processing apparatus exemplarily illustrated herein will develop perforated or non-perforated reversal, negative-positive, microfilm or sound recording film. The principal features of the present film processor, however, can be used in processing apparatus for meeting more demanding film requirements although the processing procedures and the number of steps may have to be expanded.

The present processing apparatus is designed to provide a variable speed range for film being developed from 0 to approximately 70 feet per minute with an average operating speed in the 20–25 foot per minute range. The apparatus is designed for daylight operation and employs modular construction using a stainless steel framework and chemically resistant plastic processing tanks. The tanks and film racks are mounted in line to provide ready accessibilty to all the components for routine inspection and maintenance. Each film rack can hold up to 18 feet of film and each can be adjusted in capacity depending upon the nature of the processing solutions, the solution temperatures and the type of film being processed.

The drive motor drives the plurality of film roller shafts through a chain drive and individual slip clutches so that the film flow is smooth and yet can be stopped at individual stations while the apparatus is in operation without breaking the film.

The processing tanks of the preferred embodiment are formed as dual tanks with a chemical solution in one side and rinse water in the other so that the temperature of the chemical solutions can be maintained in equilibrium with the temperature of the rinse water. The desired temperature for the rinse water is obtained by using an automatic thermostat mixing unit. These commercially available units require a source of hot and cold water. Recirculating pumps are not needed since the common wall between the rinse water and the chemical is formed of a conducting material so that the two tanks reach equilibrium temperatures rapidly.

The chemical solutions in selected tanks are replenished from independent sources of the chemicals through a series of individual purge meters which are commercially available. The wash or rinse tanks are supplied with equal amounts of water from a common header by individual metering devices which replace the water in each tank every two minutes. These multiple orifice tubes divide the total volume of the rinse water for even distribution to all rinse and wash tanks.

Daylight magazines are attached to the film accumulator cabinet through a loading bracket which incorporates a positive light lock so that all film can be processed in daylight. A light-tight film accumulator cabinet stores film to permit continuous feeding of film through the series of processing tanks even when additional lengths of films are spliced into the film moving through the machine. Further, the first two dual tanks of the film processing apparatus form a light-tight compartment so that the first processing stage can be accomplished under daylight conditions.

The drier means includes an air squeegee, a drier cabinet having a pair of film loop trees separated by a baffle, and a take-off reel assembly utilizing its own reversible motor provides a constant overdrive on the film. A separate overdrive is provided in the terminal equipment to permit a take-up reel to be exchanged without interrupting the movement of film through the apparatus. And, the film is dried with the steady flow of electrically heated air supplied by an exhaust blower and a series of individually controlled heaters.

While the film processing apparatus forming the present invention incorporates a number of individually novel features, it also provides apparatus for processing a variety of films more or less continuously and automatically. The film processor of this invention provides apparatus for the continuous processing of film combining a frame, a vertical access accumulator cabinet mounted at one end of the frame, means for attaching a film magazine to the accumulator cabinet in light-tight relation, an adjustable feed-loop rack removably mounted in the accumulator cabinet in light-tight relation thereto, a series of chemical and rinse processing tanks supported in line on the frame, quantities of selected chemical solutions and rinse water in selected ones of the tanks, means controlled by the temperature of the rinse water to stabilize the temperature of the chemicals in the tanks, a film rack removably mounted in each of the tanks and having means to adjustably select the immersed film capacity of each rack, a hood adapted to form a light-tight labyrinth for the first stage of processing, means to re-expose the film after the first processing stage, drier means, means operable to move the film serially through the accumulator cabinet, the processing tanks and the drier means at a pre-selected processing speed, an adjustable take-up reel assembly to store the processed film, and means to maintain a continuous over-pull on the film moving through the processing apparatus.

More specifically, the film processing apparatus constituting the present invention comprises the combination of a frame; a light-tight vertical access accumulator cabinet mounted at one end of the frame; an adjustable feed-loop rack mounted in the accumulator cabinet and having a plurality of film rollers mounted in spaced-apart relation thereon; a loading bracket attached to the accumulator cabinet to receive a daylight film magazine in light-tight relation; a series of chemical and rinse tanks supported in line on the frame adjacent the accumulator cabinet and selectively containing selected chemicals and rinse water; each chemical tank being one part of a dual tank having a common conducting wall with a rinse tank; an apertured tube removably threaded into each tank to permit the liquid therein to be mixed through agitation; an adjustable film rack removably mounted in each of the tanks and having a plurality of film rollers mounted on parallel shafts adjustably spaced apart to pre-set the film capacity of each rack; replenishment sources of the chemicals required to develop the film being processed; individual meter means operable to replenish the chemicals in the respective chemical sections of the dual tanks from the replenishment sources; means connected to the apertured tubes of the chemical tanks operable to introduce selected quantities of air therein to agitate the chemicals; a source of pre-selected temperature rinse water; means metering water to the apertured tubes mounted in each of the rinse tanks to continuously replace the water therein; means including a reservoir to collect and discharge the overflow liquid from the chemical and rinse tanks; a light seal form for the dual tanks utilized in the first stage of developing and rinsing including a poured resilient cushion adjacent the upper edges of the first dual tanks, a splash shield mounted on the frame and one side of the accumulator cabinet; a hood adapted to interlock with the light seal form to define a light-tight labyrinth for the first stage of film processing; a re-exposure light mounted on the frame adjacent the film exit from the hood; a drier cabinet mounted at the other end of the frame; a pair of film loop trees having spaced-apart shafts with film rollers mounted thereon in the drier cabinet to support the film as it moves therethrough, means including the heat from the electrical equipment of the apparatus, an adjustable source of heat and internal baffles to maintain air at a selected temperature in the drier cabinet; an air squeegee for the film supported on the drier cabinet intermediate the last rinse tank and the drier cabinet; means including individually adjustable slip clutches operable to drive the upper rollers on the film racks and the film elevators in the drier cabinet at a selected processing speed; an adjustable take-up reel assembly affixed to the frame adjacent the film exit on the drier cabinet; reversible means operable to drive the take-up reel assembly in a desired direction; and, means associated with the terminal film elevator in the drier cabinet and independent of the take-up reel assembly to maintain a constant over-pull on the film being processed so that a take-up reel may be changed without interfering with the continuous movement of film through the processing apparatus.

One of the features of the invention pertains to the use of the heated air obtained from cooling the electrical equipment of the film processor as an input to the drier cabinet for drying the processed film. By the use of the output from the blower associated with the processor, it is possible to maintain sufficient heat in the drier cabinet during normal operation with fewer supplemental heater units. Without this exhaust air, it is normally necessary to keep three or four of the auxiliary units in operation to dry the film.

Another feature pertains to the water distribution header through which rinse water is replenished in certain of the processing tanks. In many prior art processors, the rate of water flow into the processing tanks from an external source has to be carefully controlled in order to properly meter water to the processing tanks so as to maintain sufficient replenishment or recirculation. In the present case, however, the water is supplied from an external source through a common header at a desired temperature. A series of orifice tubes connected in parallel distribute the water evenly into each processing tank through a spray bar located in the bottom of the processing tank.

In the exemplary embodiment, each processing tank has a capacity of approximately one gallon and approximately 85 ounces of water per minute is supplied to each. This changes the water completely approximately every two minutes.

Another feature of the invention pertains to the means for agitating the water and chemical solutions in the processing tanks so that the liquids are thoroughly mixed at all times. Spray bars or tubes are removably supported in the processing tanks at the bottoms thereof. A source of compressed air is individually metered to the chemical processing tanks through individually controllable air needle valves and replenishment water is fed to the agitator tubes in the water tanks. The spray bars can be removed easily for cleaning which reduces maintenance considerably.

Another feature of the invention pertains to the means for forming a light-tight hood and labyrinth for the first stage of film processing. The light trap is formed by a hood having an open bottom and partitions therein which cooperates with a side of the accumulator cabinet and the splash shield of the film processing apparatus to provide a light labyrinth separating and surrounding the processing tanks of the first processing stage, and a light seal form constructed of a silicone rubber or the like, which is attached to a part of the processing apparatus surrounding the processing tanks of the first stages. The form has a series of channels formed therein to receive the depending edges of the hood and partitions in order to seal off the first stage from external light.

The light seal form is constructed by flooding the area around the tank in the first stage with the rubber and placing the edges of the hood and partitions therein until the material sets up.

A similar light seal is used between the accumulator cabinet and its cover. The cover is formed with depending sides so that it may be inverted and flooded with a resilient material such as the silicone rubber and the edges of the accumulator cabinet pushed therein until the rubber sets up to provide a series of deep channels which constitute a light seal for the accumulator cabinet.

Another feature of the invention pertains to the splash shield which is constructed of a chemically resistant plastic material and which is mounted on the frame alongside and behind the chemical and rinse tanks to provide means for forming the side of the light-tight compartment over the first processing stage tanks, supporting the air metering valves, the chemical replenishment meters and the re-exposure light; and, means to separate the processing tanks from the chain and sprocket of the drive means. This prevents the chemical solutions from splashing over the drive means and other unprotected moving parts of the apparatus.

The accumulator cabinet for supporting a feed-loop rack has a number of novel features beyond those mentioned. Broadly speaking, the improvement is an accumulator cabinet having an open side, a removable cover having a light trap formed therein and adapted to fit over the open side of the cabinet to make the cabinet light-tight, a film loop rack removably disposed inside the cabinet through the open side and including a plurality of rotatably mounted spaced-apart rollers, means allowing the spacing between the rollers to vary, and an externally projecting rod connected through a light shield to indicate the instant separation of the spaced-apart rollers.

More specifically, the novel light-tight accumulator cabinet or feed-in elevator combines and open-ended rectangular cabinet having film entrance and exit openings formed in opposite sides thereof, a cover member having depending sides to enclose the open end of the cabinet, a film loop rack including a generally rectangular frame attached at one of its ends to the underside of the cover, an upper shaft affixed between the upper sides of the frame and mounting a plurality of freely rotatable film rollers, a movable roller assembly having mounting blocks approximating the interior dimensions of the cabinet slideably mounted on the sides of the frame intermediate the upper shaft and the bottom of the frame, the roller assembly including a lower shaft having a plurality of freely rotatable film rollers mounted in parallel relation to the upper rollers and an auxiliary shaft mounting retainer rollers adjacent to and below each of the lower film rollers, resilient means cooperating with the sides of the frame below the movable roller assembly and the bottom of the frame to cushion the lower roller assembly when it approaches the bottom of the frame, a take-off roller rotatably mounted toward one side of the frame intermediate the upper shaft rollers and the roller assembly and adjacent the exit opening from the accumulator cabinet to prevent the emulsion side of the film being processed from being contacted as the film is pulled out of the accumulator cabinet, and a poured resilient cushion interior of the cover member channelled by the edges of the cabinet to receive the edges of the cabinet in light-tight relation thereafter and cooperate with the mounting blocks of the movable roller assembly to stabilize the film loop accumulator rack interior of the cabinet.

The light seal for the indicator rod in the accumulator cabinet includes a pair of overlying, centrally apertured chambers which are attached to the cover of the cabinet and through which the rod depends. Cooperating therewith are a pair of centrally apertured felt washers radially compressed interior of the two chambers to form a pair of contra-acting light shields for the rod as it is moved vertically therethrough.

Another novel feature of the present invention pertains to the dual tanks or double section processing tanks which provide a simple and effective means to maintain the temperature of the processing chemical solutions in fixed relation to the temperature of the rinse water used in a wash tank.

The dual processing tank is formed of a pair of mirror image, open-sided shells bonded to an intermediate thin layer of conducting material such as stainless steel. The conducting member acts as a heat exchanger surface. Through the conduction of this member, the water on one side controls the temperature of the chemical solution on the other side. This permits the controlled temperature water to be used to control the temperature of the chemical solution without any separate heating units, thermostats or other complicated paraphernalia which has heretofore been necessary to control the temperatures of the chemical solutions. As it is well known, the temperatures of the chemical solutions are quite critical in terms of film processing time as well as the quality of the finished product. For example, film processing can generally be speeded up considerably if elevated temperatures are used. This heat exchanger arrangement provides a simple and effective means to maintain the chemical solutions and rinse water at a common, pre-selected temperature.

The dual tanks are formed by casting or molding mirror shells with flanges thereon and bonding them to an intermediate sheet of conducting material. It has been found desirable to form the dual tanks by inserting spacers in the form of washers or the like on both sides of the stainless steel conducting member and the shell flanges so that room is provided for the adhesive to form a seal having no voids. Failure to use these spacers makes it difficult to provide a continuous seal without voids or other imperfections in the final tank.

The novel dual tank and film racks comprise a dual open-ended processing tank formed of two shells bonded together with a thin conducting sheet of material therebetween for use as chemical and rinse tanks respectively; a film rack adapted to be disposed in each section of the two-section tank, the film rack having a plurality of film rollers attached to a rotatable shaft mounted at its upper end, a pair of spaced-apart sides and a plurality of lower film rollers rotatably mounted at its lower end for vertical movement along its sides; means to support a film rack interior of each tank; and, means operable to drive the shaft mounting the upper film rollers at a pre-selected speed.

More specifically, the improvement in processing tank modules discussed hereinbefore comprises a two-section open top processing tank formed of two rectangularly shaped flanged shells attached to a common thin conducting sheet of stainless steel for use as chemical and rinse tanks respectively; open support saddles affixed to opposite edges of each section of the processing tank adjacent the open tops thereof; an overflow aperture formed in each section of the tank toward the upper ends thereof; openings formed in the bottom of each of the tank sections to permit the tank sections to be replenished or drained; a spray tube having perforations therein threadedly inserted in each of the sections adjacent the bottom thereof to permit the chemical in one section to be agitated with air and the rinse water in the other section to be agitated with fresh water; a rectangularly shaped film rack adapted to be disposed in each section of the two section tank; each rack having an upper shaft with a plurality of film rollers affixed thereto rotatably mounted in spaced-apart bearing blocks to form its upper end, a pair of spaced-apart guide members forming its sides and a spacer bar between the lower end of the guide members forming its lower ends and proportioned to cooperate with the interior of a tank section to stabilize the rack when it is disposed interior thereof; the bearing blocks having projections extending outwardly at each end beyond the sides of the rack to rest in the open support saddles on a tank when a film rack is disposed interior of its tank section; a lower shaft assembly on the rack including a pair of support blocks slideably mounted on the sides of the rack, a pair of shafts mounted in spaced-apart vertical relation between the slideable support blocks in parallel relation to the upper shaft; the upper one of the pair of shafts freely rotatably mounting a plurality of film rollers and the other of the pair of shafts mounting a plurality of keeper rollers in line with the film rollers and immediately adjacent thereto to retain film on the lower film rollers; a vertical rod slideably journalled through one of the bearing blocks for attachment at its lower end to the lower shaft assembly whereby the vertical position of the lower shaft assembly in the tank section can be varied; means associated with the journalled bearing block operable to lock the rod in a selected vertical position; and, drive means including an adjustable slip clutch connected to the upper shaft when the rack is disposed in a tank section to drive the upper film rollers of the rack at a pre-selected speed.

Another feature of the invention pertains to an alternative means for controlling the temperature of the chemical solutions. The alternative embodiment which employs a combination film rack and heat exchanger, is particularly useful when color film is processed. It is constructed by forming the frame of the film rack out of a series of hollow tubes through which rinse water is passed preparatory to flowing it into an adjacent rinse tank as replenishment water.

The heat exchanger film rack combines in a rectangularly shaped rack, upper-side-lower-side tubular members in serial fluid communication, inlet and outlet fittings mounted on one side of the rack and in fluid communication with the serially connected tubular members, upper and lower shafts mounted on the rack in spaced-apart relation and supporting a plurality of film rollers thereon; the lower shaft being a part of a lower roller assembly adapted to be moved vertically along the sides of the rack; auxiliary rollers disposed adjacent the lower film rollers to retain film thereon; and, drive means operable to rotate the upper shaft to cause film to move through the tank when the rack is mounted in a tank.

The film capacity of either type of processing tank can be adjusted. The lock on the rod which extends through one of the bearing blocks for the upper shaft can be released so that the rod may be moved up or down to vary the amount of film in the processing tank fluid. When a desired capacity is selected, based on the speed of the film through the tank and the characteristics of the film being processed, the rod is locked to hold the pre-set film capacity.

The take-off means for the processed film is also an interesting feature. The take-off means include the take-off reel assembly and an overdrive means associated with the terminal roller of the drier cabinet. This feature of the invention combines terminal means for drying the film having at least one driven roller to move a length of film therethrough, a take-up reel arm pivotally mounting a take-up reel adjacent the terminal means, means operable to rotate the take-up reel in timed relation with the rollers associated with the processing tanks, controlled means to maintain an over-pull of pre-selected magnitude on the film, means operable to lock the arm in a selected rotational position, and means associated with the driven roller to cause it to maintain a constant pull on the processed film independent of the take-up reel so that the latter can be changed without interrupting the movement of the film through the processing apparatus.

More specifically, the invention pertaining to this feature envisages take-off means wherein the overdrive means associated with the driven roller of the drier cabinet includes an inner-driven shaft, a hollow terminal roller of greater diameter than the other film rollers concentrically spaced on the driven shaft, and a plurality of leaf springs compressed between the terminal roller and the drive shaft to link the driven shaft and the enlarged diameter roll together in a slip clutch arrangement so that the clutch will slip to maintain the over-pull on the film.

While the film processing apparatus of the present invention is described with respect to an exemplary embodiment, it should be apparent that certain changes can be envisaged by those skilled in the art without departing from the spirit of the invention as set forth in the appended claims.

These and other objects, features and advantages of the invention will be more fully understood when the following detailed description is read with reference to the drawings in which.

*General description*

Figure 1:
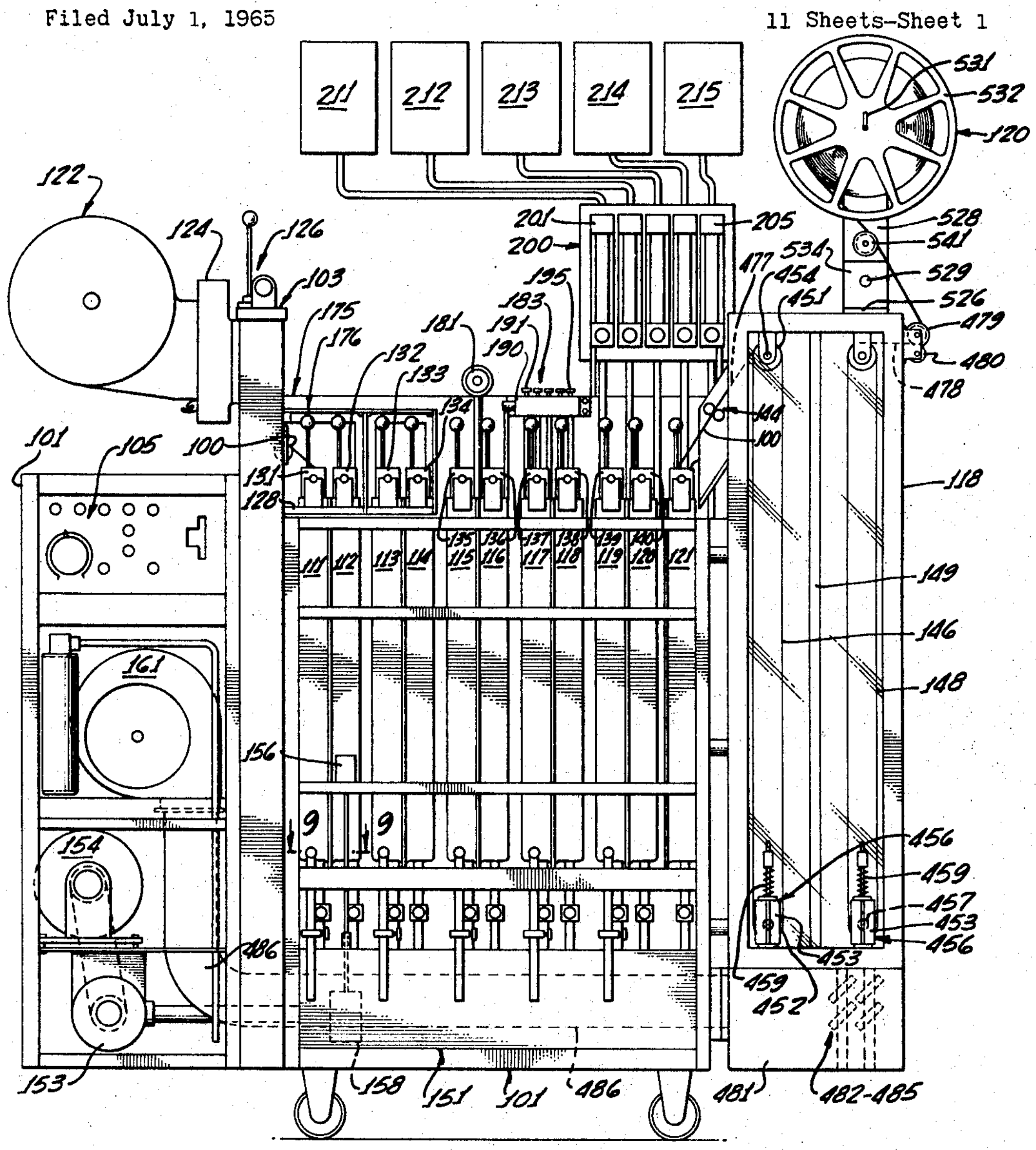
FIG. 1 is a front view of a film processor constructed in accordance with this invention with the covers removed.

As shown most clearly in FIG. 1, the film processing apparatus of the present invention includes a generally rectangular frame 101 to which are attached the principal components of the apparatus. The accumulator cabinet 103 is attached at one side of the frame 101 and a control panel 105 mounting a number of individual switches and variable transformer is attached at the upper left part of the frame 101. A series of dual processing tanks 111–112, 113–114, 115–116, 117–118 and 119–120 and a single processing tank 121 are connected in an in line relation along the frame 101 to the side of the accumulator cabinet 103. At the end of the line of processing tanks 111–121 there is provided a dual air squeegee 144, a drier cabinet 118 and a take-up reel assembly 120, the latter supported on the cabinet 118.

A daylight type film magazine 122 is removably attached to a loading bracket 124 that is affixed to the side of the accumulator cabinet 103 opposite the processing tanks 111–121. The magazine 122 and bracket 124 are in light-tight relation to each other so that the exemplary film processing apparatus may be used in daylight.

A feed loop rack 126 is mounted in the accumulator cabinet 103 to provide a reserve of film so that movement of the film through the processing tanks and drier cabinet will be continuous and smooth. Each of the dual processing tank sections 111–120 and the individual terminal rinse tank 121 have removable film racks 131–141 supported in them, and the drier cabinet 118 contains a pair of loop trees 146 and 148 partially separated by a baffle 149.

Briefly, the operation of the apparatus is as follows: The film 100 travels from the magazine 122 through the loading bracket 124 into the accumulator cabinet 103 (over feed loop rack 126) and serially through the processing tanks 111–121 (supported on film racks 131–141). From the terminal tank 121, the film travels through the air squeegee 144 into the drier cabinet 118 where it is looped through the trees 146 and 148. It leaves the drier cabinet 118 and is wound on a reel 532 which is part of the take-up reel assembly 120.

Cooperating with the film processing apparatus frame 101 and attached thereto as a reinforcing member is a splash shield 175 formed of an opaque thermosetting resin. It is mounted between the accumulator cabinet 103 and the drier cabinet 118 and behind the processing tanks 111–121 between the drive means for the apparatus and the processing tanks 111–121. The part of the splash shield 175 adjacent the accumulator cabinet 103, designated generally as 176, cooperates with a light seal form 178 and the sides of the accumulator cabinet 103 and splash shield 175 to provide a light-tight labyrinth for a hood 179 (see FIG. 6). The hood 179 forms a light-tight compartment for the first processing stage of the film processing apparatus which in the exemplary embodiment, includes the first developer and bleach and intermediate rinses.

The splash shield 175 also mounts various component parts of the film processor. The re-exposure light 181 is mounted thereon as well as the air distribution block 190 which supports a series of needle valves 191–195 which permit the adjustment of the amount of air used to agitate the solutions in the chemical tanks 111, 113, 115, 117 and 119. Metering means 200 for the chemical solutions, consisting of individual purge metering devices 201–205 which meter replenishment chemical solutions from tanks 211–215, are also attached to the splash shield 175. The air squeegee 144 which is located to the right of the terminal rinse tank 121, however, is mounted on the drier cabinet 118.

In addition to the foregoing in line components, other parts of the film processing apparatus are depicted in FIG. 1. A sump or removal tank 151 is supported on the frame 101 at the lower side of the apparatus beneath the processing tanks 111–121 to act as a common reservoir for excess chemical and rinse water which must be pumped into an external drain. Provided with the sump tank 151 is a float valve 158 which actuates a microswitch 161 to cause the excess liquid above a pre-selected level to be pumped out. This is accomplished by pump 153 which is driven by the A-C motor 154 shown at the left side of the processing apparatus in FIG. 1.

A conventional squirrel cage blower 161 designed to pull air from the inside of the cabinet of the film processing apparatus is also provided to maintain the electrical equipment at reasonable operating temperatures.

Certain other components are identifiable in FIG. 1, but they are more appropriately considered at the time the individual parts of the film processing apparatus are described in detail.

*Accumulator cabinet and feed loop rack section*

The details of the construction of the accumulator cabinet 103 and its cooperating feed loop rack 126 can best be understood by referring to FIGS. 2–5.

The accumulator cabinet 103 is elongate, rectangularly shaped having an open top for vertical access and of integral construction to prevent light from entering. The cabinet 103 is affixed to the frame 101 immediately adjacent the first processing stage which comprises the processing tanks 111–114.

Figure 3:
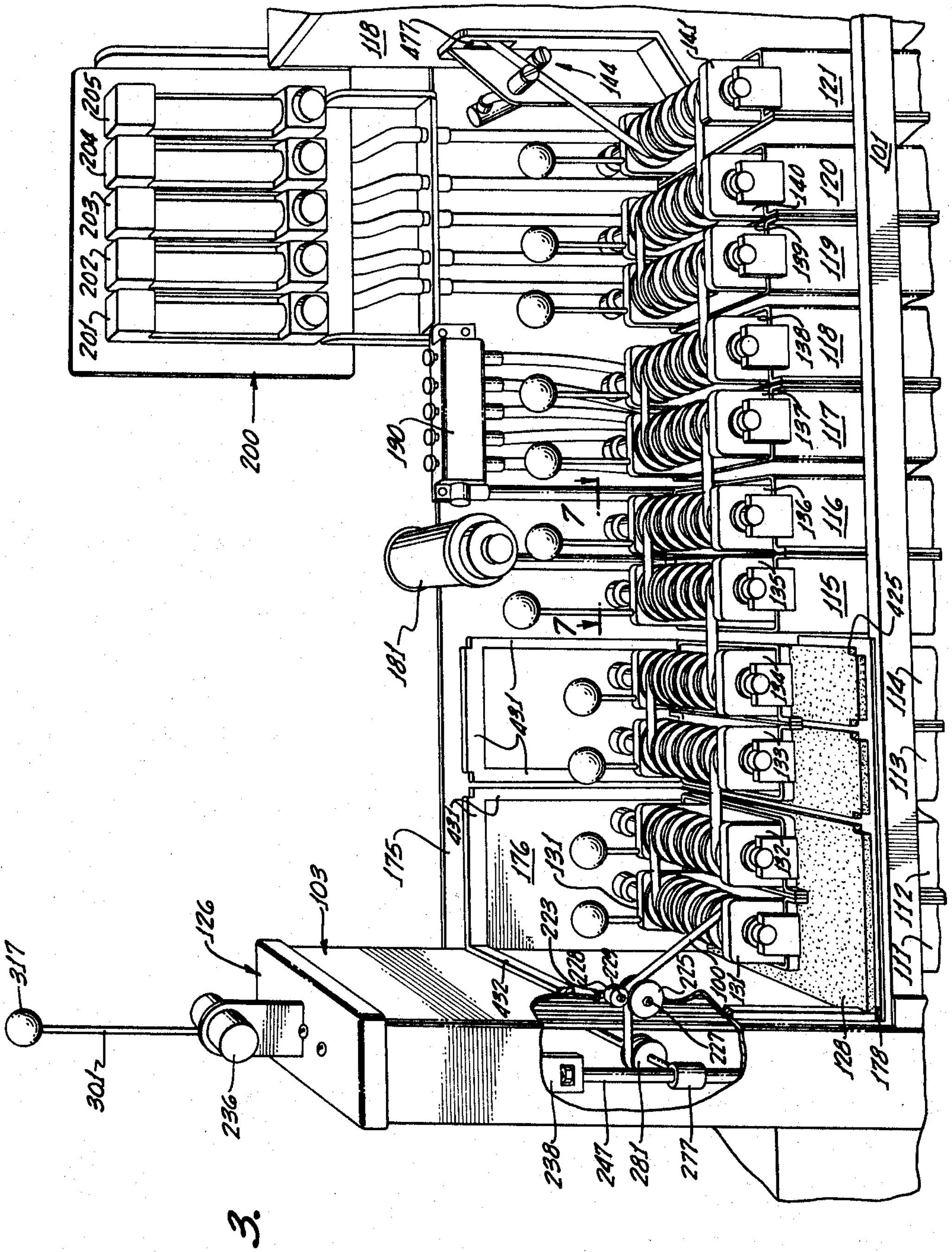
FIG. 3 is an enlarged partial front perspective of the processing tank section of the film processing apparatus with certain parts omitted and cut away to more clearly show the interrelationship of other parts.

The accumulator cabinet 103 has an inlet or input aperture 222 immediately adjacent the loading bracket 124 which is attached to its outer or left side (with respect to FIG. 1) and an outlet opening or exit opening 223 formed in its other side adjacent the tanks of the first processing stage (see FIG. 3).

Associated with the exit opening 223 is a film roller 225 which is rotatably supported on a shaft 227 adjacent the exit opening 223, and a keeper roller 228 rotatably supported on its shaft 229 immediately above and in contacting relationship with the film roller 225.

The feed loop rack 126 is mounted in the accumulator cabinet 103 and includes a rectangularly shaped cover member 231 having four depending sides 232 and a generally rectangularly shaped frame 234 attached to the underside of said cover member 231. The cover member 231 has a fixed handle 236 attached thereto to permit the feed loop rack 126 to be pulled up and out of the accumulator cabinet 103 as desired.

The generally rectangularly shaped frame 234 attached to cover member 231 includes a pair of downwardly extending spaced-apart brackets 237 and 238, a pair of spaced-apart generally tubular shaped side members 241 and 242 and a cross support member 244 connected to the side members 241, 242 by screws 245. The side members 241 and 242 of the frame 234 are connected to the brackets 237 and 238 by welding, screws or other conventional means, shown generally as 247. The frame 234 in overall construction provides a relatively rigid rectangularly shaped bracket for supporting a plurality of film rollers in spaced-apart relation.

A plurality of freely rotatable film rollers 248 are supported on a freely rotatable shaft 249 journaled between the upper brackets 237 and 238. This is to minimize friction. A strengthening cross member 251 is also attached between these depending brackets 237 and 238.

A lower roller assembly 256 is slideably mounted for movement along the side members 241 and 242 by a pair of mounting blocks 257 and 258. A lower shaft 261 is mounted between the mounting blocks 257 and 258 to freely and rotatably support a plurality of film rollers 263 thereon in spaced-apart parallel relation to the film rollers 248 mounted on the upper shaft 249.

An auxiliary shaft 265 is also provided in fixed parallel relation to the shaft 261. It mounts a plurality of keeper rollers 267 which retain the film 100 on the rollers 263 during use of the feed loop rack 126. A pair of coil springs 269 are telescoped over the lower ends of the side members 241 and 242 intermediate the movable blocks 257, 258 and the bottom cross piece 244 of the loop frame in order to provide a resilient cushion for the lower roller assembly 256 whenever it approaches the lower part of the feed loop rack 126.

Also provided are a pair of apertured weights 271 which are mounted on each of the side members 241 and 242 over the lower roller assembly 256. They are freely movable along the side members 241 and 242 to provide weighted means for urging the lower assembly 256 to move towards a position farthest removed from the upper rollers 248.

An intermediate shaft 276 is affixed between the side members 241 and 242 by a pair of apertured tubular brackets 277 which are locked to the side members 241 and 242. A single feed-out or take-off film roller 281 is rotatably supported on the shaft 276 immediately below the terminal roller of the plurality of rollers 248. When the accumulator rack 126 is supported in the accumulator cabinet 103, the terminal roller 281 is directly adjacent the exit opening 223 on the side of the accumulator cabinet 103 adjacent the first processing stage (beginning with processing tank 111). The terminal roller 281 in cooperation with the roller 225 mounted on the accumulator cabinet permits the unprocessed film to move off of the plurality of film rollers 248 and 263 into the first processing stage without the emulsion side of the film 100 contacting the accumulator cabinet, frame or other parts of the apparatus.

Figures 4, 5, 6:
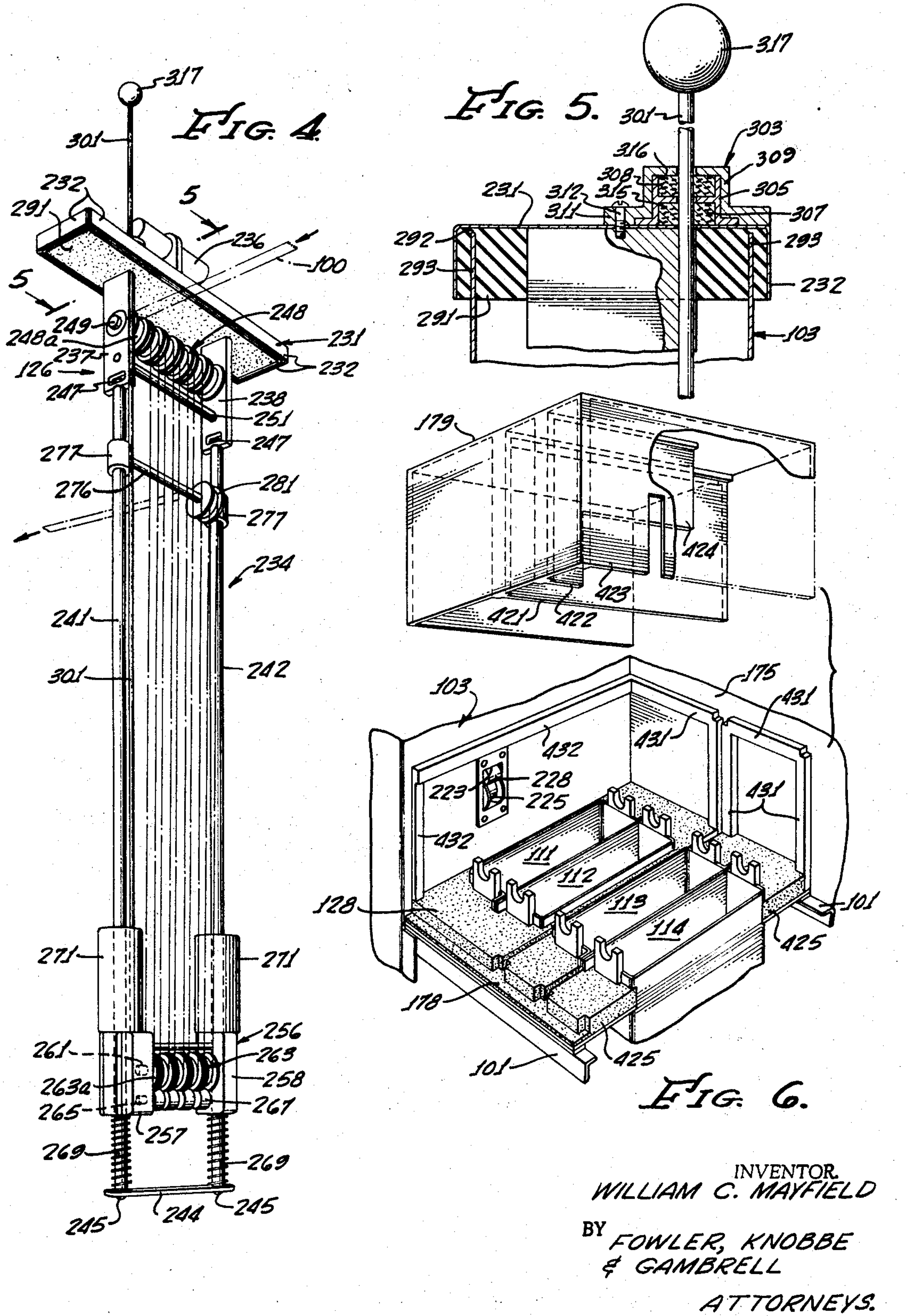
FIG. 4 is an enlarged rear perspective of the feed-loop rack which fits interior of the accumulator cabinet.
FIG. 5 is a section view of the indicator rod and cabinet light traps on the feed-loop rack cover taken along line 5—5 of FIG. 4.
FIG. 6 is a partial top perspective of the dark hood spaced apart from the light seal form therefor.

The accumulator cabinet 103 and feed loop rack 126 form a light-tight enclosure for the film in advance of the processing stages as a result of construction of a light seal 291 formed in the underside of the cover member 231 (see FIG. 5 particularly). The light-tight seal form 291 is constructed by inverting the feed loop rack 126 and flooding the rectangularly shaped cover member 231 having the depending sides 232 with a silicone rubber such as that manufactured and sold by the Dow Corning Company as R.T.V. 885, and forcing the edges 292 of the rectangularly shaped accumulator cabinet 103 into the rubber until it hardens to the point of forming a resilient light-tight seal with a series of channels 293 therein in which the edges 292 of the accumulator cabinet 103 will thereafter fit each time the feed loop rack 126 is placed in the accumulator cabinet 103.

This technique provides a simple and effective means for forming a light seal for the accumulator cabinet 103 and the feed loop rack 126, which takes into account the varying dimensions that may occur as between accumulator cabinet 103 and the cover members 231 of the feed loop racks 126.

A visual indicator rod 301 is provided to indicate the instant position of the lower roller assembly 256 during the course of operating the film processing apparatus. The rod 301 is slideably supported through the cover member 231 and is attached at its lower end to the lower roller assembly 256. A light seal 303 is associated with the cover member 231 to act as a light trap for the indicator rod 301 as it slides up and down in response to the instant location of the lower roller assembly 256.

The light seal 303 includes a flanged circular member 305 attached to the top of cover member 231 by the flange. It has a lower chamber 307 and an upper chamber 308. The upper chamber 308 is enclosed by an apertured circular bracket 309 having a stepped flange 311 thereon. The flange 311 is affixed to the cover member 231 by screw 312 or other appropriate means.

A pair of felt washers 315 and 316, centrally apertured to receive the indicator rod 301, are disposed interior of the compartments 307 and 308 and are so proportioned that they are compressed by the sides of the compartments 307 and 308 to bear against the rod 301 and as it moves in a vertical direction to seal the light from reaching the interior of the accumulator cabinet 103.

A visual indicator ball 317 is attached to the top of the indicator rod 301 so that as the rod moves up and down it will easily catch the eye of the operator and indicate whether the amount of film stored in the accumulator cabinet 103 is diminishing or increasing.

The light seal form 291 formed in the underside of the cover member 231 not only acts to seal light from the interior of the accumulator cabinet 103 but helps to stabilize the feed loop rack 126 when it is mounted in the accumulator cabinet 103 and the film processing apparatus is being operated. In combination with the movable mounting blocks 257 and 258, it does stabilize the rack 126.

The movable mounting blocks 257 and 258 have dimensions approximating the width of the accumulator cabinet 103 and their separation approximates the side-to-side spacing interior of the accumulator cabinet 103 so that when the feed loop rack 126 is disposed interior of the accumulator cabinet 103, the blocks 257, 258 also act to stabilize the lower end of the feed loop rack 126.

As can be seen particularly with reference to FIG. 4, the film 100 leads in over the upper roller 248*a* and down over lower roller 263*a*, etc. to form a series of helical loops between the upper and lower rollers 248 and 263 until the final rollers are reached, at which time the film 100 threads over the terminal roller 281 out of the exit opening 223 of the accumulator cabinet 103.

It will be noted that the exit opening 223 (see FIG. 3) is immediately adjacent the position of the terminal roller 281 when the film loop rack 126 is disposed interior of the accumulator cabinet 103 so that the emulsion side of the film 100 (the upper side as shown in FIG. 3) does not contact the roller, the frame or parts of the accumulator cabinet. The film moves past the exit opening over roller 225 and down onto the first film rack 131 which is mounted in the first chemical processing tank 111.

*Dual processing tanks and film racks*

The next components of the film processor which must be understood are the interchangeable dual processing tanks 111–112, 113–114, 115–116, 117–118 and 119–120 and the interchangeable film racks 131–141 which are associated with each section of these dual tanks as well as the single rinse tank 121. The first embodiment of dual tanks 111–120 and their associated film racks 131–140 will be described principally in connection with FIGS. 7, 9 and 10. An alternative embodiment utilizing single processing tanks and heat exchanger film racks will be described in connection with FIGS. 21–25.

Figure 7:
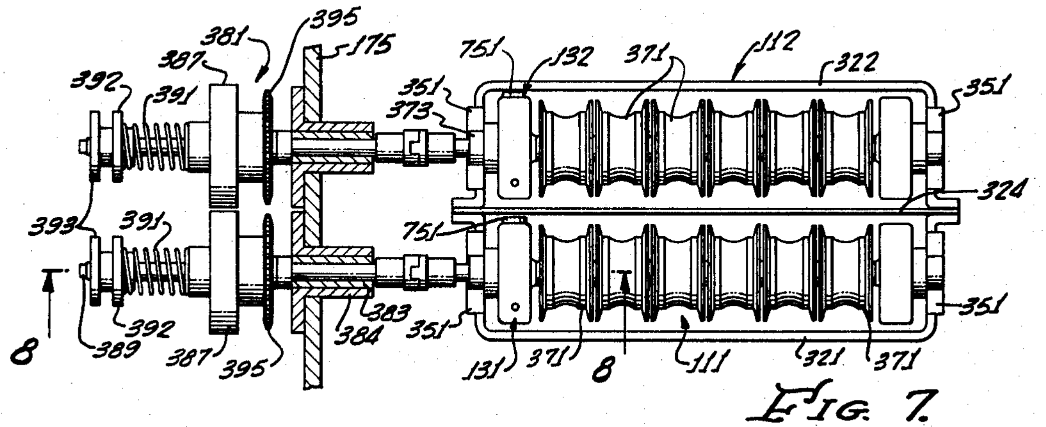
FIG. 7 is a top view of a typical twin processing tank, the individual film rack supported within and the drive assembly for the film rollers of the racks—taken along line 7—7 of FIG. 3.
Figure 9:
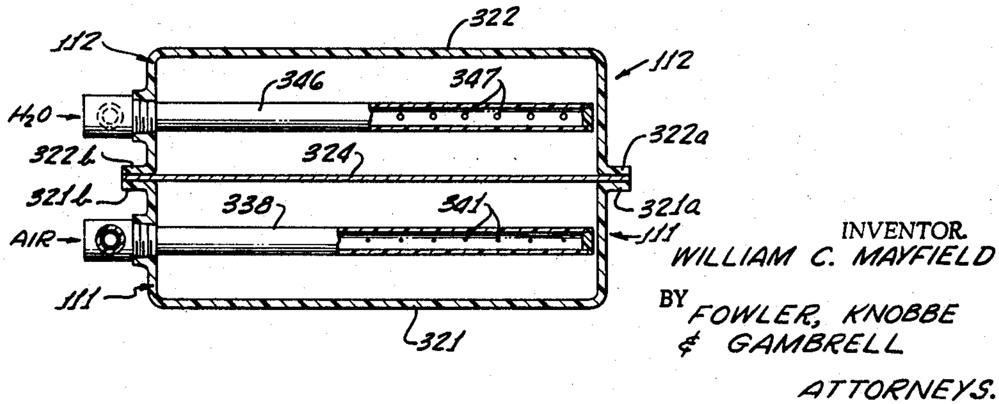
FIG. 9 is a section view of the lower part of a typical twin tank taken along line 9—9 of FIG. 1 with the agitator tubes threaded interior of each tank section.

Turning to the description of the first embodiment, which is the one illustrated in connection with other parts of the film processing apparatus, a dual processing tank (e.g. 111–112) can be seen to include a pair of open-sided generally rectangularly shaped shells 321 and 322 having flanges 321*a*, *b* and 322*a*, *b* which are bonded together with a thin sheet 324 of stainless steel therebetween (see FIGS. 7 and 9). The shells 321 and 322 are identical and are bonded with a silicone rubber such as R.T.V. 732 supplied by the Dow Corning Company.

A series of washers or other spacers (not specifically shown in the figures) are spaced-apart between the stainless steel sheet 324 and the flanges 321*a*, *b* and 322*a*, *b* so that a definite thickness of the adhesive can set up between the sheet 324 and the flanges 321*a*, *b*, 322*a*, *b*. This provides a solid joint without any voids or other defects in the bond. It is necessary to use spacers of some sort or the adhesive will have voids or other imperfections in it due to the pressure exerted on the flanges 321*a*, *b* and 322*a*, *b* while the joint is formed.

A number of fittings are connected to the sections of a dual tank such as 111–112 for various purposes. Each section of the tanks 111 and 112 are apertured and have attached thereto overflow fittings 325 and 326 so that fluids in the tanks can overflow and be guided by way of tubular members 327 and 328 into the sump tank 151. There is also provided a drain outlet 331 and 332 in the bottoms of each of the tanks 111 and 112, and an additional drain outlet 333 in the chemical tank 111 so that the chemical solution may be drained and saved (by way of tube 334).

A chemical solution input tube 336 is attached to the connector body of drain fitting 331 at the bottom of tank 111 so that the chemical solutions from the replenishment supply 201 can be directed into the tank 111 during use of the film processing apparatus.

Also in connection with the chemical tank 111, there is provided a spray bar or tube 338 which is threadedly inserted in the side of the tank 111 so that the chemical solution therein can be thoroughly mixed by an air input. The spray bar 338 has a series of small orifices 341 cut in its upper side so that a source of air from the tube 342 can move through the spray bar and agitate the chemical solution therein.

The rinse tank 112 also has a spray bar 346 threadedly attached to the lower part of shell 112. It is similar to spray bar 338 except that the series of apertures 347 therein are larger so that replenishment water by way of tube 348 will flow through the spray bar 346 and both replace and mix the rinse water in the tank 112 during operation of the film processing apparatus.

A pair of open saddle blocks **351*a* and 351*b* are attached to each edge of the tanks 111–121. They are formed to cradle the film racks 131–141 interior of their respective processing tanks 111–121. As can be seen, particularly in connection with FIG. 10, the open saddle blocks 351*a* and 351*b* are generally rectangular in shape and have a half circle excised from their upper end so that they can journal the rotating shafts of the film racks 131–141 in their respective tanks 111–121**.

Figure 10:
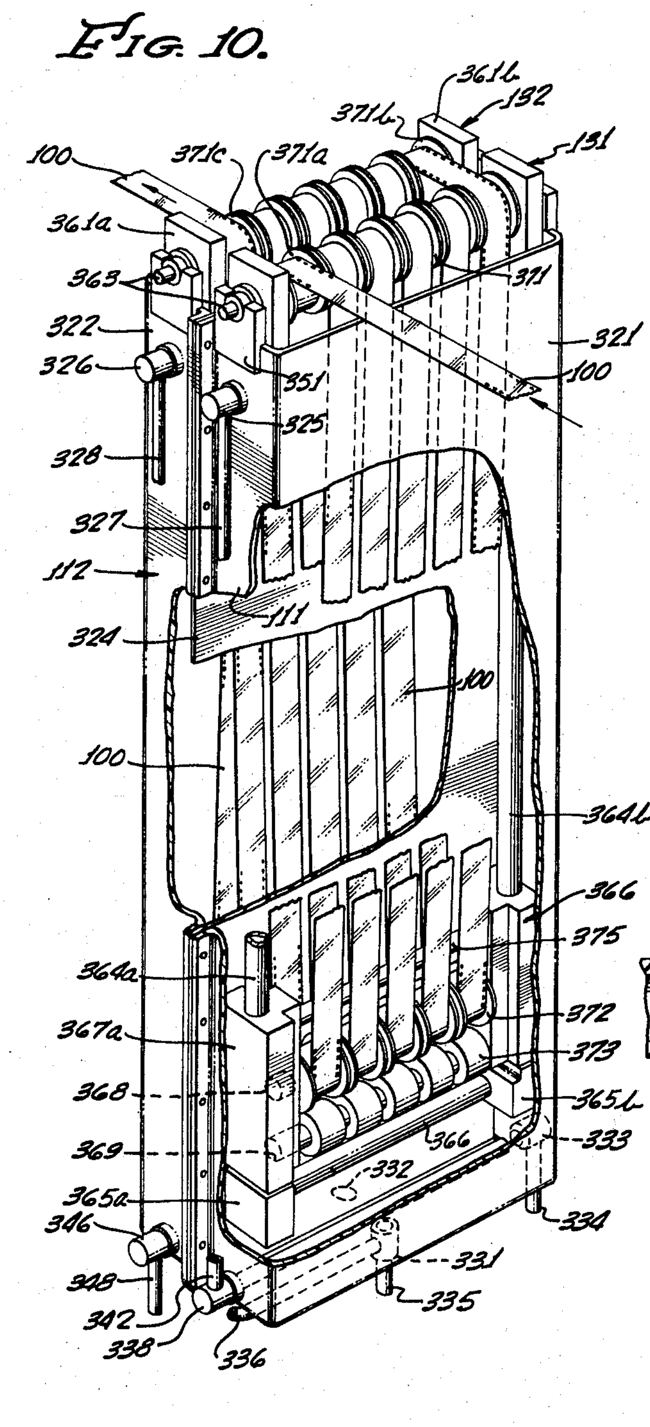
FIG. 10 is a partial perspective of a typical twin processing tank and the film loop racks mounted therein with certain portions cut away to more clearly show the cooperation of the parts.

Looking now to the construction of the film racks 131–141, rack 131 or 132 may be taken as exemplary (see FIG. 10). Each consists of a pair of spaced-apart support blocks **361*a* and 361*b* which rotatably support a shaft 363 therebetween. A pair of spaced-apart parallel side members 364*a* and 364*b* are affixed to the lower sides of the support blocks 361*a* and 361*b* and are connected at their lower ends by a spacing bar 366 by way of fittings 365*a* and 365*b***.

The upper shaft 363 of a typical film rack has a plurality of rollers 371 staked thereon and an enlarged boss 373 on each end outward of the mounting blocks **361*a* and 361*b* to ride in the open saddle 351 of a processing tank such as 111 so that the upper shaft 363 and the rollers 371** thereon can be rotated by a drive means, the operation of which will be explained hereinafter.

Also forming part of a typical film rack such as 131 is a lower roller assembly 366 which includes a pair of movable support blocks **367*a* and 367*b* which are mounted for vertical movement along the side members 364*a* and 364*b*. Supported between the movable support blocks 367*a* and 367*b* are a pair of spaced-apart shafts 368 and 369. Shaft 368 supports a plurality of film rollers 372 which underlie and are spaced-apart from film rollers 371 on the upper shaft 363 but which are freely rotatable on shaft 368 and have no separate drive means. The second shaft 369 is an auxiliary shaft and mounts a plurality of retainer rollers 373 which ride adjacent the grooves in the rollers 371 and prevent the film which is disposed on the film rollers from moving off of the rollers during operation of the film processing apparatus. A fixed transverse strengthening member 375 is also provided between the mounting blocks 367*a* and 367*b* to stabilize the lower roller assembly 366**.

An indicator and adjusting rod 377 is journaled through upper mounting block **361*a* and attached to the lower end of the movable support block 367*a* and, as the lower roller assembly 366 moves up and down interior of a tank such as 111, the position of the indicator rod 377 and the indicator ball 378 thereon indicates the relative position of the lower roller assembly 366. By this means, the instant film capacity of the film rack 131 after it is disposed in the film processing tank 111** is known at all times.

Means are provided to lock the rod 377 at a certain position to fix the film capacity of the film rack. A screw is threaded into an upper mounting block to bear against the indicator rod 377 and prevent its upward and downward movement. This particular locking device is shown in connection with the alternative embodiment of FIG. 21 but the operation is the same for either type of film rack.

In operation, the film 100 is fed into the dual tank 111–112 from the right side (when looking at FIG. 10) over the initial film roller **371*a* and down over the first lower film roller 372*a* and so on, back and forth, between the upper and lower film rollers until the film moves onto the initial roller 371*b* on the film rack 132 associated with the rinse tank 112. It thereafter threads back and forth between the upper and lower rollers on rack 132 until it leads out over the terminal roller 371*c* into the next adjacent film processing tank 113** (not shown in FIG. 10).

The fittings **365*a* and 365*b* are proportioned on their external dimensions to ride close by the conducting side 324** and the interior surface of the outer wall of its tank to stabilize the film rack when it is interior of a processing tank.

*Film drive means*

The drive means can best be described in connection with FIGS. 7, 8, 15 and 16. When the processing tanks 111–121 are properly supported on the frame 101 of the film processing apparatus and their respective film racks 131–141 are mounted therein on the open saddle supports 351, the outer ends of the upper shafts 363 are adapted to engage an individual film rack drive 381.

Each drive assembly 381 includes a shaft 382 journaled for rotation by bushing 383 and sleeve 384, the latter being affixed to the splash shield 175. The friction clutch 386 includes a pair of circular face members 387 and 388 and a felt disc 389 therebetween. The flat disc 388 is slideably but non-rotatably mounted on the shaft 382 (by a keyway **390*a* and screw key 390*b*), while the other disc 387 is affixed to sprocket 395. The disc 388 is spring loaded against the felt pad 389 and the friction disc 387 by a coil spring 391 which is tensioned by nut 392 threadedly mounted on the outer end of shaft 382. Also cooperating with the tensioning nut 392 and shaft 382 is a lock nut 393**.

Affixed to the inner end 396 of the shaft 382 is a rectangularly shaped male member 397 adapted to slideably fit into a slotted female member 398 which, in turn, is connected to the end of shaft 363 of a rack 131. The connectors 397, 398 operationally connect shaft 382 in rotatable relationship with the upper shaft 363 of a typical film rack 131.

As can be appreciated, as the chain sprocket 395 is rotated by the drive means hereinafter described, it rotates the shaft 382 and, hence, the shaft 363 of the film rack through the felt disc 389 of the clutch 386. By adjusting the friction on clutch 386, it is possible to adjust the degree of slippage so that the film may be stopped by the operator placing his hand on the upper film rollers or the shaft of a film rack without the necessity of shutting down the machine for individual rack adjustments.

The slip clutch arrangement also makes it possible to prevent breakage of the film whenever too much pressure is placed on the film due to some malfunction of one or more of the parts of the film processing apparatus. Then, too, each film rack 131–141 has an individual slip clutch assembly 381 which permits them to be adjusted individually.

Figures 15, 16, 17, 18:
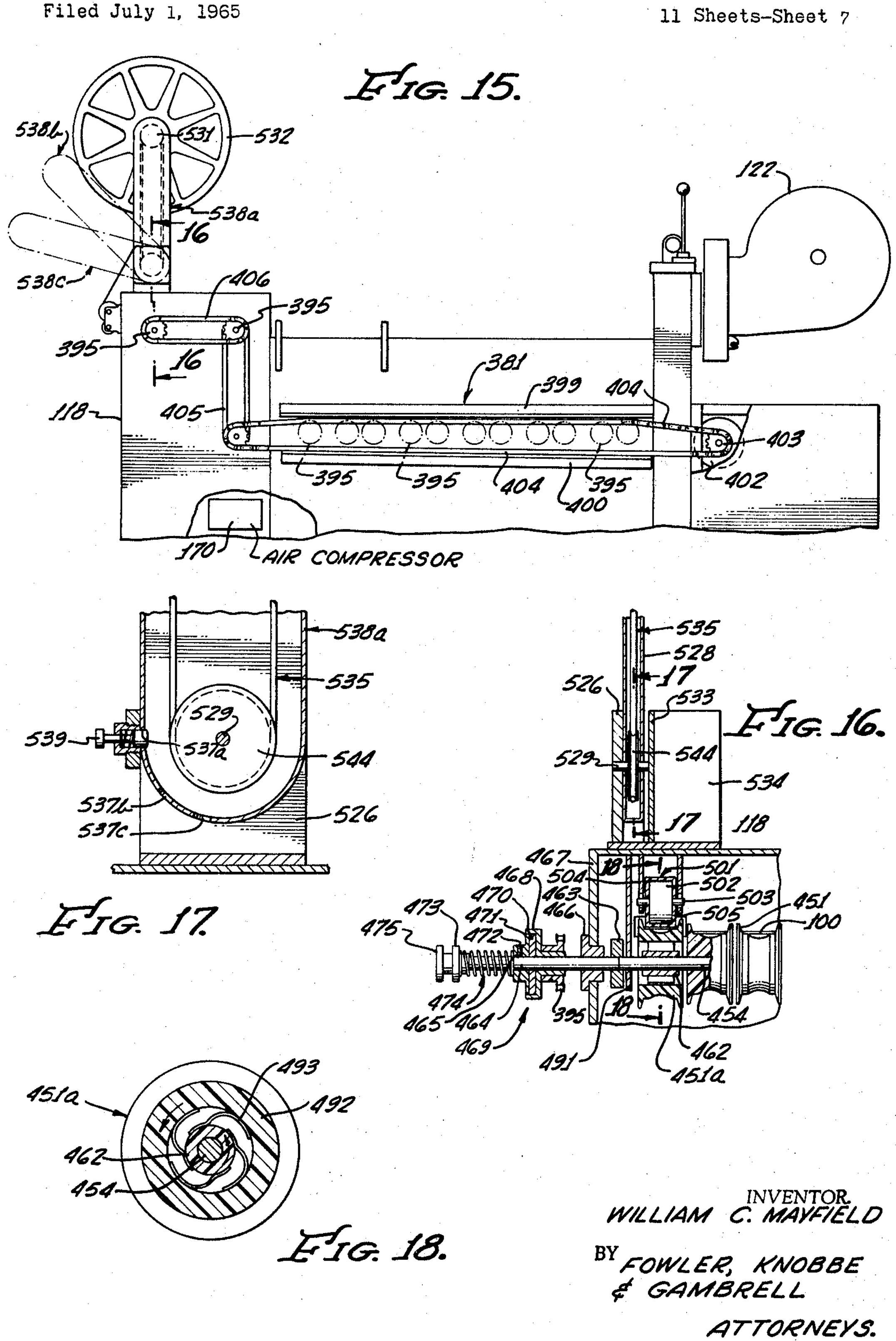
FIG. 15 is an upper back view of the film processing apparatus with the covers removed and parts cut away to show the drive means for the film racks and the adjustable take-up reel assembly.
FIG. 16 is a side section view taken along line 16—16 of FIG. 15 to illustrate parts of the take-off means and the overdrive arrangement on the terminal film roller in the drier cabinet.
FIG. 17 is a section view taken along line 17—17 of FIG. 16 to show the manner in which the take-up reel arm is held in its different positions.
FIG. 18 is a cross-section view of the slip clutch for the terminal film roller taken along line 18—18 of FIG. 16 with certain other parts omitted.

The means for driving the sprockets 395 associated with each of the film racks 131–141 can best be seen in FIG. 15, which is a rear view of the upper part of the film processing apparatus. The D-C motor 402 mounted on the frame 101 rotates a 20 tooth drive sprocket 403 which drives the sprockets 395, each of which has 19 teeth, associated with the individual film racks 131–141 through a closed chain 404. This provides roughly a 5% overdrive for each film rack 131–141 and each loop tree 146, 148.

Extension chain drives 405, 406 drive the sprockets 395 which are rotatably mounted at the rear of the drier cabinet 118. Although belts or other means for driving the individual film racks could be provided, the instant chain drive is sturdy and dependable. Moreover, the connectors 397–398 permit each individual film rack to be lifted out of its processing tank for inspection without elaborately decoupling the drive means 381 from the driven shaft 363 of its film rack.

Figure 8:
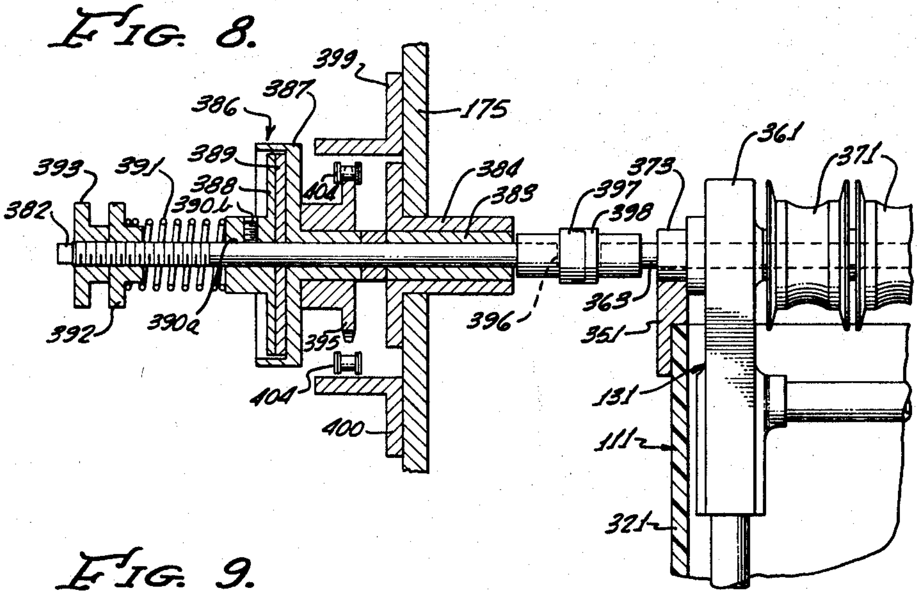
FIG. 8 is a partial side section view of the drive assembly for the film racks taken along line 8—8 of FIG. 7.

As can be seen in FIGS. 8 and 15, attached to the rear side of splash shield 175 above and below the sprockets 395 are L-shaped members 399 and 400. These members extend along the back of the splash shield 175 (see FIG. 15) to retain the chain 404 on the sprockets 395. They also incidentally act as a shield for the chain drive.

*First processing stage compartment*

This light-tight compartment 178 is shown most clearly in FIG. 6, although some parts thereof can also be seen in FIGS. 1 and 3. This compartment for the first processing stage which covers processing tanks 111–114 is formed by one side of the accumulator cabinet 103, a section of the splash shield 175, a resilient cushion of material 128 formed in and around the upper edges of the processing tanks 111–114 and by the opaque hood 179.

The hood 179 is generally rectangular in shape and has a series of vertical, spaced-apart separators 421, 422, 423 and 424 affixed therein to separate and bear against the flat plate 425 which is affixed to the frame 101 and extends out adjacent the front and back sides of the processing tanks 111–114. There is also provided a series of outwardly projecting shoulders 431 and 432 on the splash shield 175 and the accumulator cabinet 103, respectively, which cooperate with the edges of the light cover or hood 179 to form a light-tight seal.

In order to assure a seal around the processing tanks 111–114, temporary plates are placed along the right side of tank 114 (see FIG. 6) and along the front of the frame 101 and a quantity of silicone rubber (such as R.T.V. 885) is flooded onto the platform 425. Then, the hood 179 is placed therein and is held there while the resilient material 128 hardens. After the material sets up, a series of channels are formed therein which are directly positioned to cooperate with the separators 421–424 and the edges of the hood 179 to provide a tight, vibration damped compartment 178 for the first processing stage of the film.

*Drier cabinet*

The overall drier cabinet can be seen best in FIG. 1, but certain details are illustrated in FIGS. 16 and 18. Looking particularly to FIG. 1 first, the drier cabinet 118 includes means for supporting a series of loops of film on loop trees 146 and 148 and an intermediate baffle plate 149.

The loop trees 146 and 148 each comprise a plurality of upper film rollers 451 and a plurality of lower film rollers 452 supported in spaced-apart relation at the upper and lower ends of the drier cabinet 118. Two of the film rollers 451 on a loop tree are staked to a shaft 454 which is adapted to be rotated by a drive assembly quite similar to assembly 381 for the individual film racks 131–141 in the processing tanks. The plurality of lower film rollers 452 are freely rotatably supported by a lower support assembly 456. The lower support assembly 456 includes a pair of spaced-apart brackets 453 mounting a shaft 457 and spring means 459 biasing the lower rollers 452 downwardly to protect the film during the drying operation.

A typical drive assembly for the rollers 451 and their shaft 454 can best be understood in connection with FIG. 16. The shaft 454 has a sleeve 462 locked on it which extends interior of the terminal roller 451*a*. The operation of roller 451*a* will be explained more clearly hereinafter.

The sleeve 462 and shaft 454 are connected by a coupling 463 to a drive shaft 464 which is journaled for rotation in sleeve 466, the latter extending through and affixed to the rear wall 467 of the drier cabinet 118. Moreover, a hanger 491 supports the shaft 454 in a ball bearing race (not shown) so that the rollers 451 are mounted for rotation independently of the drive means therefor.

A sprocket 395 is attached to one plate 468 of clutch 469, which is similar to the clutches associated with the film racks 131–141 and previously described. The clutch 469 includes a felt disc 470 and another pressure plate 471 which is slideably but non-rotatably connected to shaft 464 by screw 472 riding in a slot 465 in the shaft 464.

The pressure plate 471 is held on the shaft 464 by a tension nut 473 which bears against a coil spring 474 mounted on the shaft 464. A locking nut 475 cooperates with tension nut 473 to maintain a selected setting of the clutch 469.

The sprocket 395 in common with the other sprockets described previously is driven by the drive chains 404, 405 and 406 which are actuated by the motor 402 by way of sprocket 403.

As the film leaves the last processing tank 121, it moves through the air squeegee 144 and enters an opening 477 in the drier cabinet 118 and moves over an initial roller 451 of the first loop tree 146 and thence downward and under one of the freely rotatable rollers 452 associated with the lower assembly 456 and then back in a loop over an upper roller 451 and so on, until it finally moves over the baffle 149 and onto the series of upper and lower rollers 451 and 452 on the loop tree 148. It finally moves over the terminal roller 451*a* and out of the exit aperture 478 in the drier cabinet 118 and onto the take-up reel assembly 120. A guide roller 479 is rotatably mounted immediately outside of the exit opening 470 on the drier cabinet 118. It cooperates with a keeper roller 480 to guide the film 100 out of the drier cabinet 118 and onto the take-up reel assembly 120.

There is a lower heating compartment 481 at the lower part of the drier cabinet which includes a number of heater elements 482–485 which are individually controllable to vary the amount of heated air flowing through the drier cabinet 118. Also, the exhaust from the fan 161 is connected through an exhaust tube 486 to the cabinet 481 to provide additional heated air for drying the film in the drier cabinet 118. It has been found that by utilizing the exhaust air from the electrical equipment of the processing apparatus, it is possible to operate the drier cabinet 118 with only one or two of the heaters 482–485 cut in while processing most black and white reversal films.

An overdrive means is provided in cooperation with the terminal roller 451*a* on the drier elevator 148 so that the take-off reel 532 can be removed and replaced without interrupting the movement of the film 100 through the processing apparatus. This particular arrangement of the overdrive arrangement can best be seen in connection with FIGS. 16 and 18. The terminal roller 451*a* is formed of an inner sleeve 462 surrounding the shaft 454 and a hollow V-sleeve 492 of the film roller 451*a* disposed concentrically around the inner sleeve 462. The sleeves 462 and 492 are normally caused to rotate together due to a plurality of spring members 493 which are compressed between the outer surface of sleeve 462 and the internal surface of sleeve 492. The shaft 454 and sleeve 462 rotate and, through the compressed resilient member 493, the outer member 492 acts as a slave. Since the diameter of the outer roller 492 is greater than that of the other film rollers 451, it places a constant pull on the terminal portion of the film 100 and maintains a constant movement of the film out of the drier cabinet 118.

To maintain the film 100 on the oversized film roller 451*a*, there is provided a weighted roller 501 including a brass or other heavy internal member 502 rotatably supported on a shaft 503. The shaft 503 is mounted in spaced-apart depending brackets 504. The brackets 504 may be attached to the inner surface of the top of the drier cabinet 118. The core 502 is covered with a resilient material 505, such as neoprene or the like, so that it does not scratch the exposed surface of the film 100 as it rests in the groove on terminal roller 451*a*.

The shaft 503 may be supported in a pair of vertical slots formed in the brackets 504 so that it can ride up and down. The weight of the drive roller 501 acts to urge the film to travel at the speed of the oversized sleeve 492, and yet, the sleeve 492 slips against the hoop tension of the springs 493 to maintain the constant tensioned flow of film through the processing apparatus.

Whenever the take-off reel 532 is removed, the terminal roller 451*a* of the drier cabinet 118 continues to maintain a constant pull on the film and does not interrupt or interfere with the smooth and uniform processing of the film through the various chemical processing tanks and rinse baths. As soon as a reel 532 is replaced, the take-up reel motor 532 again acts to wind up the processed film on the take-up reel 532.

*Take-off reel assembly*

The take-off reel assembly 120 is illustrated in FIGS. 1, and 15–17. It includes mounting bracket 526 affixed to the upper part of the drier cabinet 118, a movable take-off reel arm 528 pivotally mounted on the bracket 526 by shaft 529, a shaft 531 mounted on the other end of the take-off arm 528 and having means thereon to retain a conventional film reel 532 thereon and a reversible motor 532 operable to rotate the take-up reel 532 in either direction through a drive linkage 535.

The take-up reel arm 528 is rotatably mounted on shaft 529 which is journaled by an upstanding bracket 526 on the drier cabinet 118. There are provided a series of notches 537*a* and 537*b* and 537*c* to position the take-up reel arm 528 in one of three positions, shown in the solid and two dotted line positions of FIG. 15 and identified as 538*a*, 538*b* and 538*c*. Associated with the arm 528 is a spring loaded plunger 539 which is manually movable outwardly to permit the take-up arm 528 to be rotated until the plunger 539 can ride in one of the selected slots 537*a*, 537*b* or 537*c* and maintain the take-up arm 528 in the selected position. This makes it possible to position the take-up reel assembly 120 in the vertical position 538*a* (FIG. 15) if space is at a premium, or in a 45° or a horizontal position (positions 538*b* and 538*c*) if it is not.

There is also provided a guide roller 541 which is rotatably supported on the motor mount bracket 533 to prevent the film from contacting the edge of the drive motor 534 or other parts of the frame 101 as the amount of film on the take-up reel 532 increases and when arm 528 is in position 537*a*. As can be seen from the illustration in FIG. 1, the film 100 moves out of the exit 478 of the drier cabinet 118 between the guide rollers 479 and retainer roller 480 against the guide roller 541 and onto the take-up reel 532.

The reversible motor 534 is mounted directly onto the upstanding bracket 533 and rotates an internal pulley 544 associated with bracket 526. Pulley 544 is connected through the drive linkage 535 to the take-up reel mount 531. This permits adjustment of the take-off arm 528 to any position without interfering with the drive linkage for the take-up reel 532.

*Loading bracket*

The loading bracket 124 is affixed to the left side of the accumulator cabinet 103 adjacent the inlet aperture 222 therein, and is adapted to support a daylight magazine 122 in light-tight relation to the accumulator cabinet 103. The loading bracket 124 has a generally rectangularly shaped body member 601 with a pair of vertically in line jaws 602 having felt pads 603 on their facing ends. They are urged to a contacting relation by a spring 604 which is associated with the lower of the jaw 602. When the magazine 122 is put in position on the bracket 124, the spring 604 is compressed and the jaws 602 move apart to provide an opening through the loading bracket 124 for the movement of film into the accumulator cabinet 103.

The magazine 122 has a similar pair of vertically in line jaws 608, including felt pads 609 affixed to their contacting ends, which are urged together by a coil spring 611 when the magazine 122 is not mounted on the bracket 124.

Figure 2:
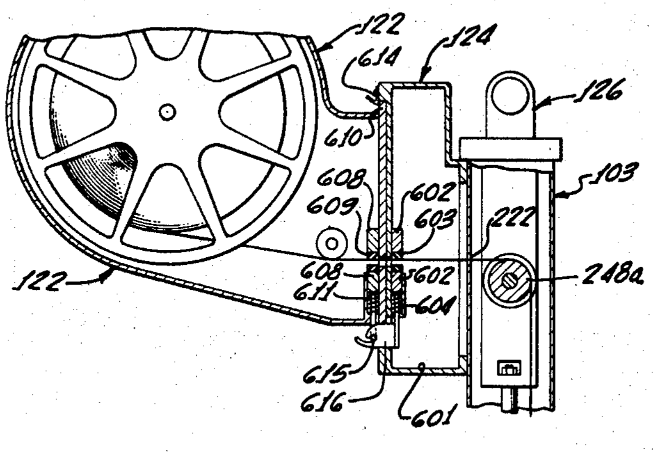
FIG. 2 is a front section view of the loading bracket illustrating the light seal between the film magazine and the accumulator cabinet.

The magazine 122 is provided with a mounting shaft 615 which is attached to jaw 608 and is adapted to fit interior of a pair of generally C-shaped brackets 616. The brackets 616 are attached to the lower jaw 602 of the bracket 124 and slideably mounted in the lower end of the body 601 thereof. When the shaft 615 is placed in the C-shaped brackets 616 and the magazine 122 is rotated into a closed position against the bracket 124 (as illustrated in FIG. 2), the lower jaw 608 is cammed downwardly and opened, and the lower jaw 602 is pulled down by the downward movement of the C-shaped brackets 616, which movement occurs so that the spring lock 614 can hold the upper end 610 of the magazine 122 in the closed position illustrated.

When the magazine 122 is pivoted open, the C-shaped brackets 616 releases shaft 615 so the jaws 608 close and bracket 616 moves upwardly to close jaws 602 so as to form a light seal.

*Alternate heat exchanger film rack and tank*

In the exemplary embodiment of the processing tanks and film racks associated therewith, dual tanks such as 111–112 were utilized so that the temperature of rinse water in one side of the tank 112 could act through a conducting sheet of stainless steel 324 to maintain the temperature of the chemical solution in the preceding tank 111 in equilibrium with it. This dual tank arrangement provides an effective means for controlling the temperature of the chemical solutions when the apparatus is being used to process black and white film since, in most instances, the chemical solution needed to process film are alternated with rinse tanks. In many film processing operations, however, particularly when color film is processed, it is necessary to provide one or more chemical solution steps before a rinse operation occurs. Moreover, it is often necessary to provide a number of film racks to hold the film in a specific solution for a period of time in excess of the capacity of the film racks disclosed herein. In these cases, it is necessary, or at least often desirable, to use individual processing tanks, multiple rack or larger tanks and control the temperature of the chemical solution by other means.

The prior art discloses many techniques for controlling the temperature, the most usual being the insertion of a heating element and a thermometer in the chemical tank to heat the solution as necessary and, by this means, control the temperature—depending upon the type of film being processed and the particular chemicals used. While these various prior art techniques have worked well enough, they are necessarily complicated. They do not provide the simple means for maintaining the chemical solutions at proper temperature, as do the dual tanks described hereinbefore in some detail.

In those cases where processing tanks need an independent means for controlling the temperature of the chemical solutions, a combination heat exchange-film rack will work well. The result will be virtually the same as that obtained by the use of dual tanks wherein the rinse water temperature acts to maintain the chemical solution in an equilibrium condition through the aegis of the conducting sheet between it and the chemical side of the dual tanks. An exemplary heat exchanger processing tank is illustrated in FIGS. 21–25. While the general outlines of the film rack and the processing tanks are similar, it will be helpful to describe it in some detail so that the differences can be appreciated.

The heat exchanger film rack 650 is generally rectangularly shaped and is disposed in an open top rectangularly shaped processing tank 651. The processing tank 651 is quite similar to one section of the dual processing tanks 111–112, 113–114, 115–116, 117–118, 119–120 previously described. The exemplary processing tank 651 includes a pair of side members 652, a bottom section 653 and a pair of sides 654. A pair of open saddle blocks 656 are attached to the upper edges of the sides 652 by screw member 657 or some other appropriate means. Half circle bearing supports are cut in their upper ends 659 to receive the film rack 650 and maintain it in the tank during operation of the film processing apparatus.

Figure 22:
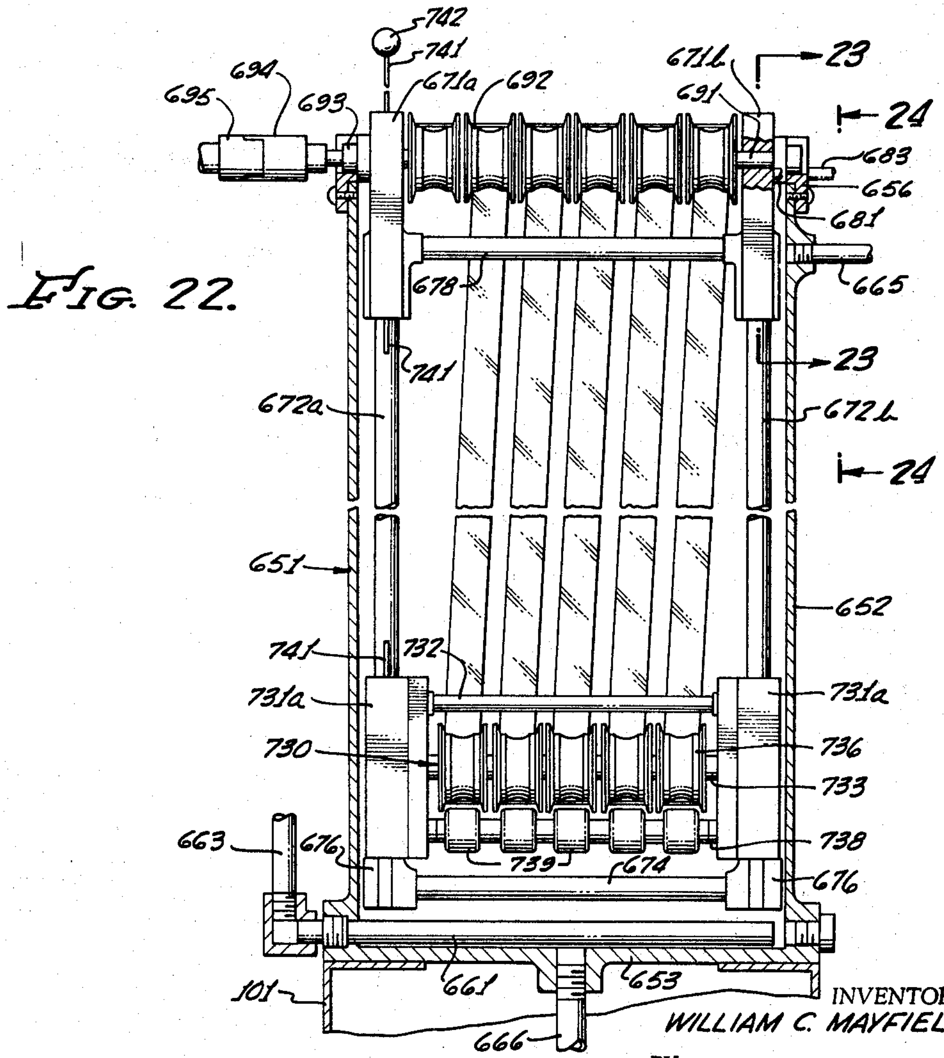
FIG. 22 is a side section view of the alternative embodiment of the heat exchanger film rack taken along line 22—22 of FIG. 21.
Figure 24:
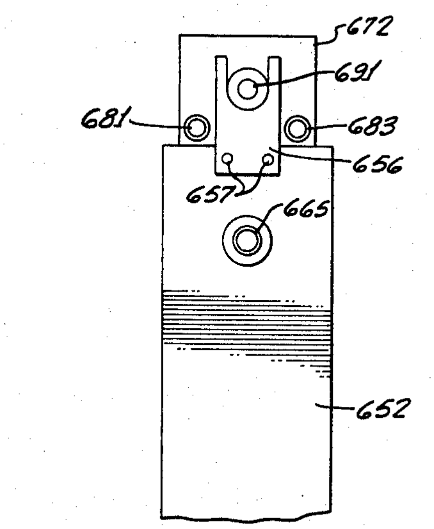
FIG. 24 is a partial end view of the heat exchanger film rack mounted in a tank taken along line 24—24 of FIG. 22; and, FIGS. *25a* and *25b* are schematic representations of exemplary interconnections of heat exchanger film racks and rinse tanks for processing different types of films.
Figure 23:
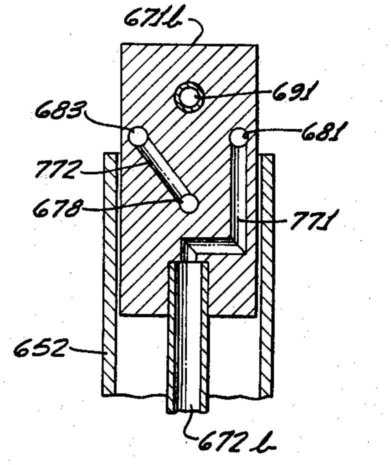
FIG. 23 is a section view of one end of the heat exchanger film rack taken along line 23—23 of FIG. 22.

As illustrated, particularly in FIG. 22, the film tank 651 is supported on the frame 101 of the processing apparatus and there would be a number of the tanks 651 supported in an in line relation for the operation of the film processing apparatus through a series of steps, much the same as the series of steps exemplarily described herein in connection with dual tanks. The tank 651 in common with tanks 111–121 has means for threading an apertured agitator bar 661 in from one side 652 and a tube 663 connecting it to a source of air such as 170, an overflow fitting 665 attached to one part of the upper side 652, and a drain fitting 666 formed in the bottom 653 of the tank 651. There would also be provided a second drain (not shown) by which the chemical solution in the tank 51 could be drained for subsequent use.

The heat exchanger film rack 650 is of general rectangular shape and includes a pair of spaced-apart upper support blocks 671*a* and 671*b*, a pair of tubular spaced-apart members 672*a* and 672*b* attached at one set of their ends into the lower part of the support blocks 671*a* and 671*b* and whose other ends are held in spaced-apart relation to the side members 672*a*, 672*b* by spacer tube 674. Right angle fittings 676 connect the side members 672*a*, 672*b* to the spacer tube 674. The tubular side members 672*a*, 672*b* are also in fluid communication with each other through the lower tubular member 674 and the fittings 676. An upper tubular member 678 is also mounted between the support blocks 671*a* and 671*b*.

One end of the tubular member 678 is in fluid communication with one side member, e.g. 672*a*, by way of the support block 671*a*. The other end of the tubular member 678 is in fluid communication through the upper support block 671*b* with a tubular fitting 681. And, the uppper end of the right tubular side member 672*b* is in fluid communication through the same upper support block 671*b* with another fitting 683.

The fittings 681 and 683 extend outwardly beyond the side of the tank 650 (illustrated particularly in FIGS. 21 and 22) and are adapted to receive a pair of clamp fittings 684 and 685 which are connected on the one hand to a source of rinse water and, on the other hand, to the input to the next adjacent rinse tank.

Figure 19:
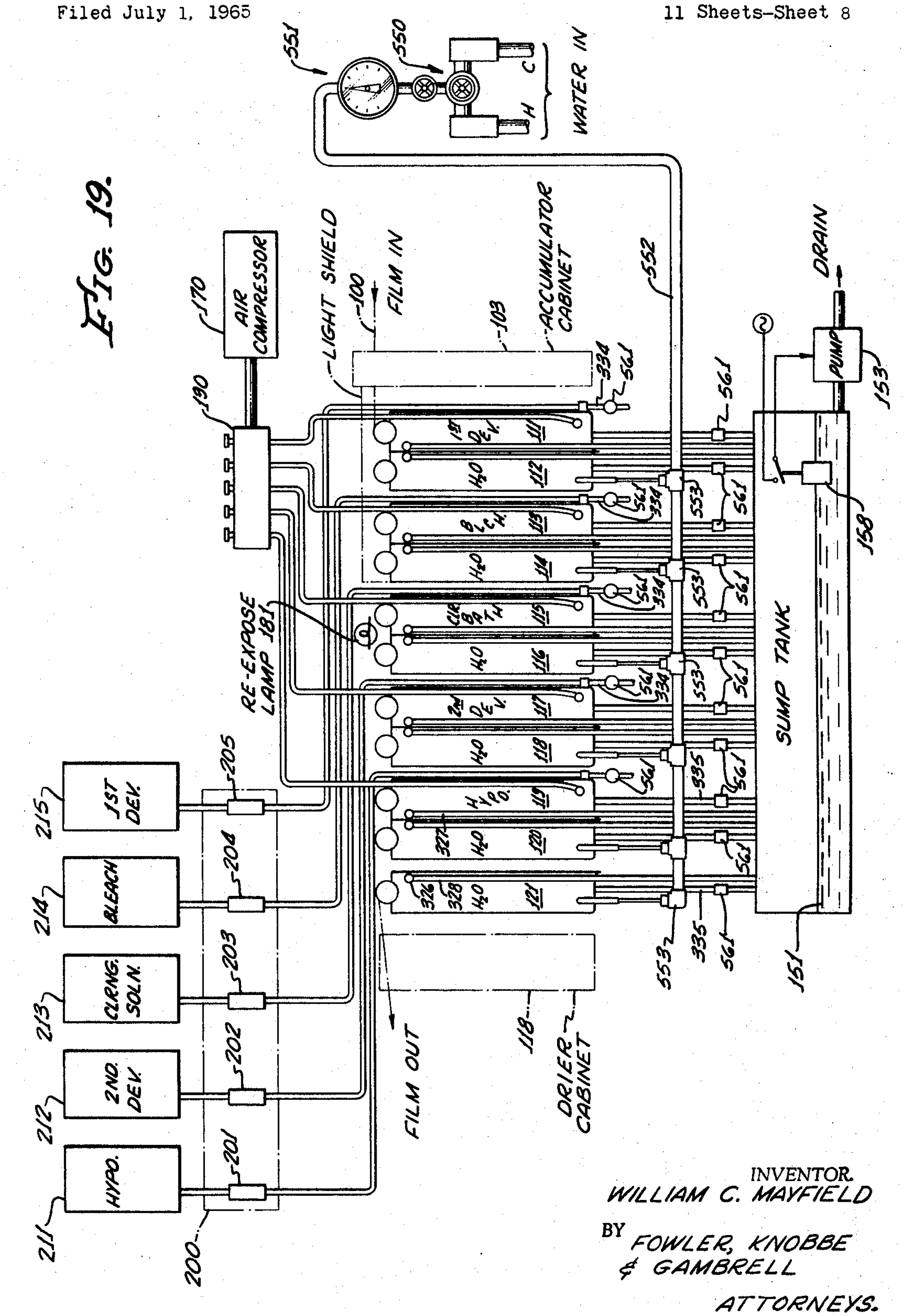
FIG. 19 is a schematic flow diagram of the liquid and air piping for the film processor of the present invention.

When the heat exchanger film rack 650 is supported in the tank 651, a source of rinse water such as the supply 551 illustrated in FIG. 19 is connected to one input fitting 684 and the fitting 685 is attached to the input of a next adjacent rinse tank so that the rinse water of pre-selected temperature will flow serially through the upper tubular member 678, the tubular side member 672*a*, the lower tubular member 674 and the side member 672*b* before flowing into the rinse tank. As a result, the tempered rinse water in the tubular members maintains the chemical solutions in tanks such as 651 in equilibrium with the temperature of the rinse water into which the film 100 will move after it leaves the chemical solution processing tank.

Figure 25A:
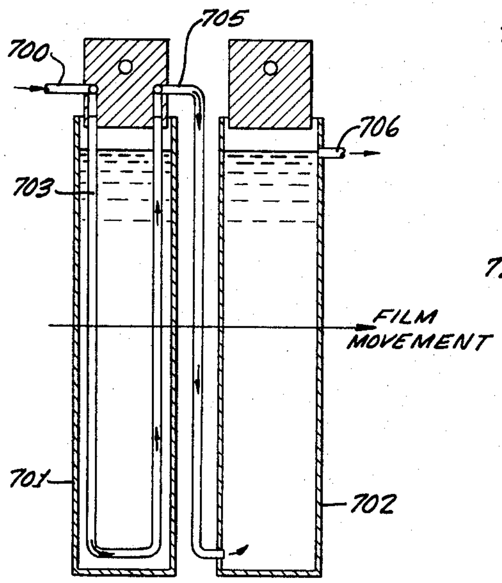
Figure 25B:
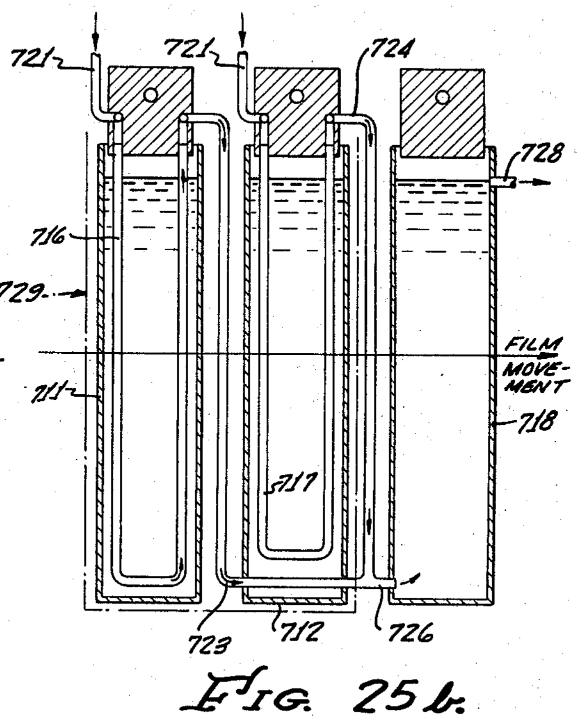

Two exemplary arrangements for utilizing such heat exchanger film racks are illustrated in FIGS. 25*a* and 25*b*. In FIG. 25*a*, there is shown a pair of single processing tanks 701 and 702 in an in line relation with the film movement from left to right as shown. The tempered rinse water flows into one side 700 of the heat exchanger film rack 703 (similar to rack 650) which is suspended in tank 701, through the tubular heat exchanger frame thereof and out through tube 705. The rinse water then flows into the lower part of rinse tank 702 to supply rinse water for the film from the tank 701. Overflow water from tank 702 would flow out of overflow tube 706 and into a sump tank, such as tank 151 illustrated in FIGS. 1 and 19.

An alternative arrangement for use of heat exchange film racks such as 650 is illustrated in FIG. 25*b*. Here there is provided a pair of chemical processing tanks 711 and 712 having heat exchanger film processing racks 716 and 717 mounted therein. Rinse tank 718 is also shown in an in line arrangement with the chemical processing tank 711 and 712. In this arrangement, a source of water flows into one set of sides 721 of the tubular frames of racks 716 and 717 and out through tubes 723 and 724 into a common input tube 726 which is connected to the input of the rinse tank 718. Again, the overflow water from the rinse tank 718 flows out of the tube 728 into a sump tank such as 151.

In this case, the film movement is again from left to right. FIG. 25*b* illustrates the use of the heat exchanger film racks in connection with processing of color film, for example, where the film moves through a chemical solution such as a first developer and into a stop bath directly without any intermediate rinse step. It may be that the chemical solutions in each of the chemical tanks 711 and 712 would be the same chemical solution but they would require two racks because of the amount of time the film must be kept in the chemical solution. In such a case, individual tanks such as 711 and 712 could be used or a single large tank (shown as a dotted tank 729) could be used. A pair of support saddles on each side would be used and a pair of the heat exchanger film racks such as 716 and 717 would be supported in the single tank.

While it has not been mentioned what type of film racks are disposed in the rinse tanks 702 and 718 of FIGS. 25*a* and 25*b*, it can be the same type as those used in the chemical solution tanks 701, 711 and 712, except that the tubular frame would not have to be used as a heat exchanger in the rinse tank. Other than this, they would function in the same way.

In using the heat exchanger film racks 650 as described herein, clamps 684 and 685 would be selected so that they are easily removed from the fitting 681 and 683 for quick disconnections when a rack 650 is to be taken out of its processing tank 651.

Looking back to the film rack 650, in addition to the tubular frame construction including tubular members 672*a*, 672*b*, 674 and 678, there is provided a shaft 691 journaled between the upper support blocks 671*a* and 671*b* and mounting a plurality of film rollers 692 fixed thereon for supporting loops of film. The shaft 691 extends outwardly through the sides of the upper mounting blocks 671*a*, 671*b*. The extension beyond block 671*a* has a molded bushing 693 integral therewith which is adapted to fit in the open circle of the saddle support member 656. The shaft 691 also extends outwardly with a female slotted member 694 attached thereto. It is engaged by the male member 695 in a manner similar to the drive means connector described in connection with the film processing racks 131–141 used with the processing tanks 111–121.

The film rack 650 also includes a lower roller assembly 730 having a pair of movable support blocks 731*a*, 731*b* slideably mounted on the side member 672*a*, 672*b*, respectively, for vertical movement. The movable support blocks 731*a*, 731*b* mount a stabilizing member 732, a shaft 733 with a plurality of rotatable film rollers 736, and an auxiliary shaft 738 with a plurality of keeper rollers 739 to maintain the film on the film rollers 736. The overall arrangement is quite similar to the manner in which the lower roller assembly 366 of the previously described film racks 131–141 are constructed.

A positioning rod 741 having an indicator ball 742 on its upper end is journaled in the upper support block 671*a* and extends therethrough into the lower roller assembly 730 and is attached to movable support block 731*a* therein.

The positioning rod 741 can be pushed up and down to position the lower roller assembly 730 depending upon the amount of film that it is desired to have in a tank such as 651 at any moment. The rod can be locked in a desired position by the means referred to earlier. More specifically, and looking to FIG. 21, it can be seen that a locking screw 751 is threadedly mounted in the upper mounting block 671*a* in a generally horizontally direction. It has an end which bears against the positioning rod 741. By screwing the locking screw 751 inwardly, it contacts the rod 741 and locks it at a given vertical position.

Looking back to the upper support blocks and particularly upper support block 671*b*, the fluid channels formed therein during the molding process can be appreciated. As noted, the side tubular member 672*b* is in fluid communication with a channel 771 which is in turn connected to the fitting 681, whereas the upper tubular member 678 is in fluid communication with the externally mounted fitting 683. Movement of the tempered rinse water is from fitting 681 through the side member 672*b*, down through the lower support member 674, up through the other side member 672*a*, through the upper tubular member 678 and out of the other fitting 683 at the right side of the processing tank 651. The other fixed support block 761*a* has only a single channel (not shown) to place the side member 672*a* and the upper tubular member 678 in fluid communication with each other.

*Operation of the film processing apparatus*

Figure 20:
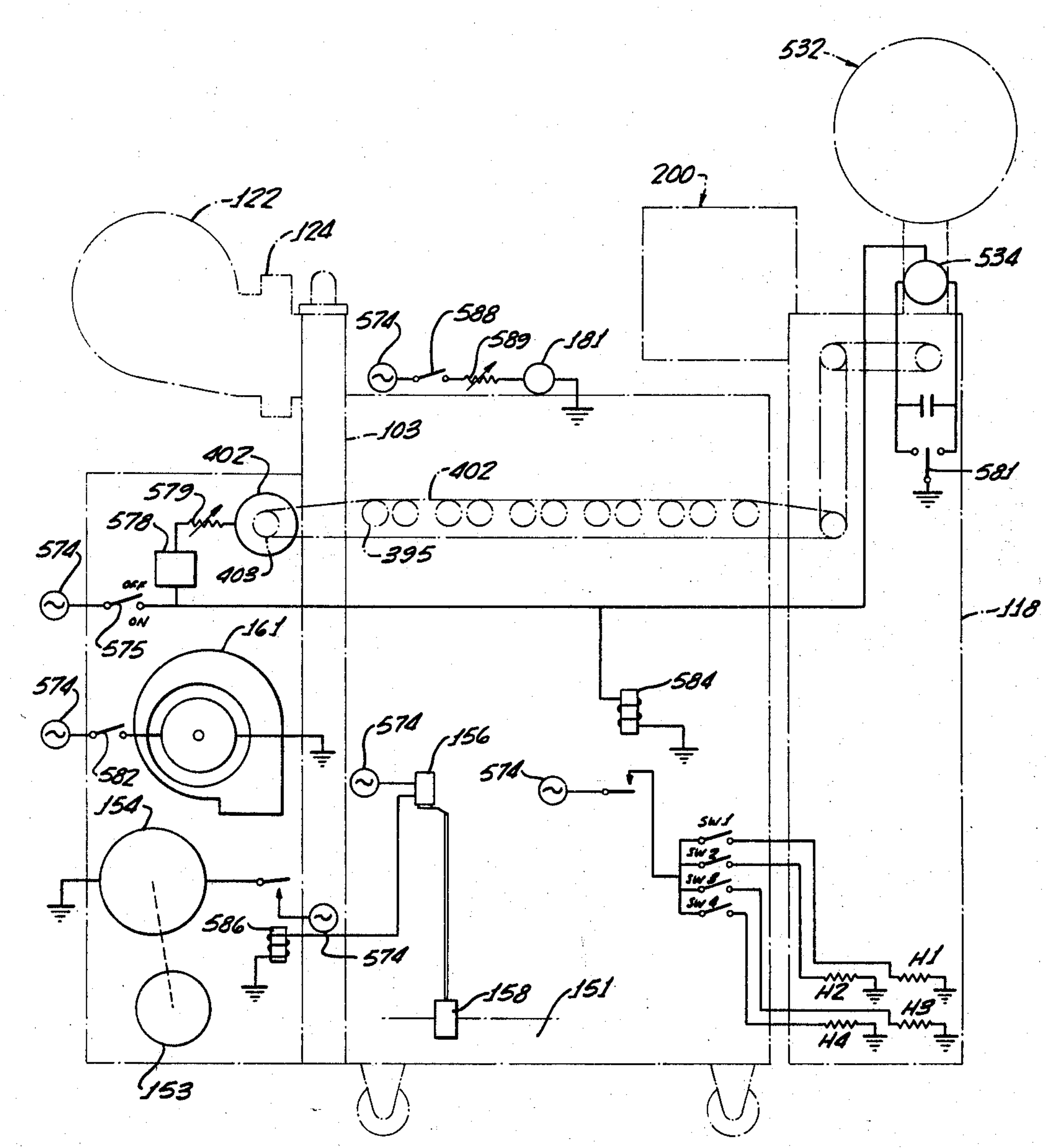
FIG. 20 is a partial schematic diagram of the electrical components and circuitry for the film processor of the present invention.
Figure 21:
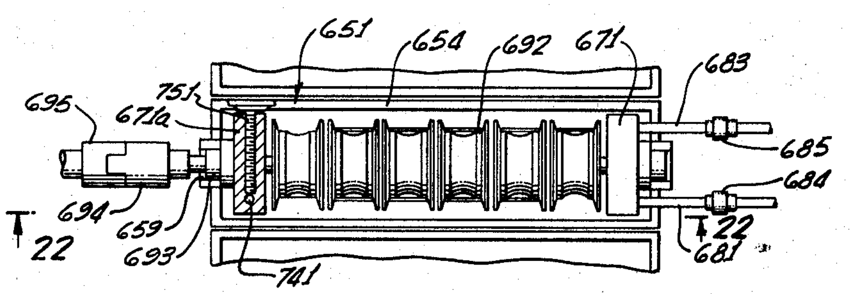
FIG. 21 is the top view of an alternative embodiment of a film feed rack disposed in a film tank, which rack also acts as a heat exchanger for chemical solutions.

FIG. 19 is a schematic diagram of the liquid and gas flow through the film processing apparatus, and FIG. 20 is an electrical and schematic block diagram of the various components of the apparatus.

Looking first to FIG. 19, in view of the previous detailed description, the general operation of the apparatus can be followed. Before starting the operation, the chemical solutions are placed in processing tanks 111, 113, 115, 117 and 119 and in their replenishment source containers 211–215. For example, a first developer is placed in tanks 111 and 211; a bleach in tanks 113 and 212; a clearing bath in tanks 115 and 213; a second developer in tanks 117 and 214; and a hypo or fix in tanks 119 and 215. The rate of chemical replenishment is set for each tank 211–215 by the individual meters 201–205. (Meters such as 211–215 are illustrated in more detail in FIG. 12.)

The rinse tanks 112, 114, 116, 118, 120 and 121 are filled with water from a source such as 550, and the temperature of the water is selected according to the film being processed by adjustment of the thermostatically controlled mixing valve 551. This is a commercially available unit, e.g., one is sold by the Powers Regulators Company of Skokie, Ill.

Figure 11:
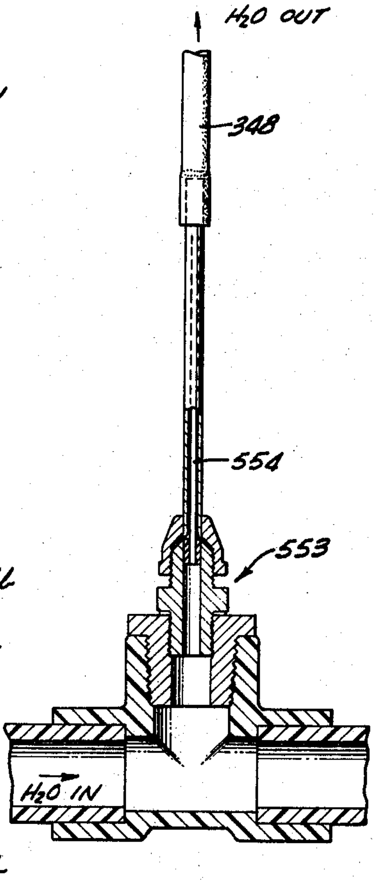
FIG. 11 is a section view of one of the rinse water inlet tubes which are illustrated schematically in FIG. 19.

The tempered water is piped through a common tube 552 from valve 551 to a series of water inlet orifices 553 which are associated individually with each of the rinse tanks 112, 114, 116, 118, 120 and 121 (see FIG. 11). Orifices 553 act to distribute the water flowing through conduit 552 equally to each of the rinse tanks 112, 114, 116, 118, 120 and 121 so that no adjustment need be made as to the volume of water entering the conduit 552. The length of the restricted internal tube 554 and the water pressure determines the rate of flow. It is only necessary to turn the valve 551 on and select the right temperature. The metering orifices 553 provide the proper amount of replenishment water for each of the rinse tanks. In the exemplary embodiment, the inside diameter of tube 554 is approximately 1/16 in. and its length is 4¾ in. This provides approximately 85 ounces of water per minute at an individual spray bar 346 when the external water pressure is approximately 90 p.s.i., which replaces the rinse water about once every two minutes. Overflow water, of course, flows into sump tank 151 by way of overflow fittings 326 and tubes 328.

Next, the film capacity of the film racks 131, 133, 135, 137 and 139 are set by their positioning rods 377 in accordance with the type of film being processed.

Air for agitating and mixing the chemical solutions is supplied to air spray bars 338 in each tank 111, 113, 115, 117 and 119 through the individually adjustable valves 191–195 of air valve block 190. These valves 191–195 are adjusted to adequately mix the chemical solutions to prevent the film from being streaked or otherwise poorly developed (see FIG. 14 for detail).

The film magazine 122 is loaded in a dark room with the film 100 to be processed, and the magazine 122 is attached to the loading bracket 124 after the end of the film 100 is stapled to a length of leader which is threaded through the feed loop rack 126, the film racks 131–141 and the drier cabinet loop trees 146 and 148. Thereafter the light hood 179 is placed on form 178 to enclose the first processing stage.

After the foregoing preliminaries, the drive motor 402 is energized and film moves through the processing apparatus on a continuous basis. As it leaves the drier cabinet 118, it is wound up on the take-up reel 532.

The exhaustion of the film in the magazine 122 is indicated by the indicator rod 301 on the feed loop rack 126 moving upward. This occurs because the end of the film is attached to the interior of the magazine 122. As soon as the movement of the indicator rod is detected, the magazine 122 is unlocked and the end of the film 100 removed and stapled to the leader or film in another magazine to be processed. The new magazine is snapped into place and the processing continues. The indicator rod 301 on the feed loop rack 126 is thereafter gently forced down to re-establish the desired feed loop.

Whenever the level of the fluid in sump tank 151 raises the float 158 above a pre-selected position, it actuates a microswitch 156 and causes the pump 153 to drain the sump tank 151 back to the point where the float releases the microswitch.

Figures 12, 13:
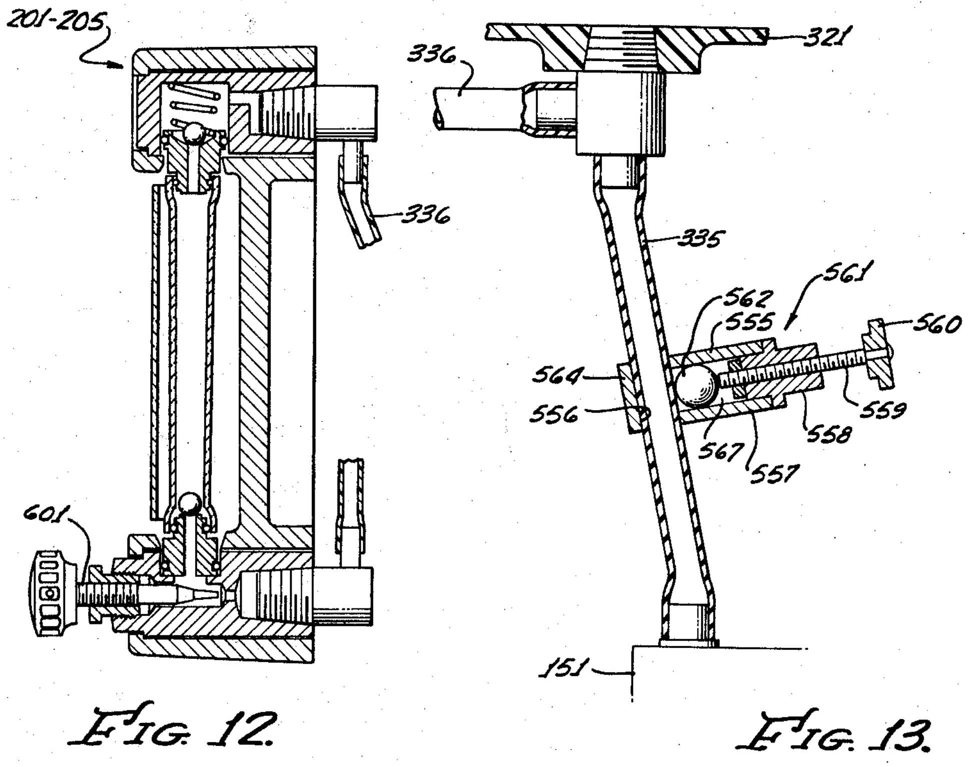
FIG. 12 is a section view of one of the metering devices for chemical solutions.
FIG. 13 is a side section view of one of the discharge tube ball valve clamps which are shown schematically in FIG. 19.

Associated with each chemical processing tank 111, 113, 115, 117 and 119 are tubes 334 through which the solutions may be drained and saved if desired. Individual clamps 561 clamp the tubes 334 closed. Similar clamps 561 are provided on the drain tubes 335 from the chemical and rinse water tanks 111–121 to permit the tanks to be emptied after the processing operation is completed. (The details of a typical clamp are illustrated in FIG. 13 as briefly described hereinafter.)

Looking to the electrical components of the film processing apparatus schematically illustrated in FIG. 20, the electrical circuits controlling the various components can be understood. When the apparatus is initially turned on, the switch 575 is closed placing alternating current 574 to one side of A-C to D-C converter 578 which is associated with speed controller 579 and the drive motor 402. A typical drive motor and controller is sold by the Minarik Electric Company of Los Angeles as Model SH34. This unit uses a shunt wound Bodine motor No. B2408–10.

The master on-off switch 575 also places alternating current 574 on one side of the reversible take-up motor 534. This motor can also be controlled through a three-position switch 581 which can cause the take-up motor 534 to rotate in a forward position or a reverse position. A neutral off position is also provided. Once switch 575 is closed, speed controller 579 is adjusted to select the rate of movement of film through the film processing apparatus and the take-up motor 534 is put in its forward or reverse position depending upon whether the film is to be wound with its emulsion side in or out on the take-up reel 532. A typical motor 534 is the K2 series constant torque motor by the Bodine Electric Company using a capacitor start.

Independently of turning on the motors 402 and 534, a separate switch 582 is provided to turn on the blower 161 so that it can be left on beyond the point of shutting down the machine if it is necessary to cool the components of the film processor after processing is completed.

Closure of the switch 575 also operates a relay 584 which in turn operates to place alternating current 574 on one side of a bank of parallel switches SW1–SW4. These switches are individualy connected through independent heating elements H1, H2, H3 and H4 to ground. Thus, after the master switch 575 is closed, individual operation of switches SW1, SW2, SW3 and SW4 select the proper amount of heat for the drier cabinet 118, depending upon the type of film being processed and the rate of movement of the film through the processing apparatus.

The pump 153, which is adapted to pump out the excess fluid in the sump tank 151, is operated independently of the operation of the machine. It is actuated whenever the float 158 actuates microswitch 156 that controls relay 586. In operating, relay 586 connects alternating current 574 to motor 154 which operates pump 153 to reduce the level of liquid in the sump tank 151 until the microswitch 156 opens the circuit.

The re-expose light 181 is also part of an independent circuit. By the operation of switch 588, a circuit is closed from source 574 through variable transformer 589 and the re-expose light 181 to ground. Thus, the intensity of re-expose light 181 can be varied depending upon the amount of re-exposure needed during the operation of the film processing apparatus. The light can also be utilized independently by the operator as a general utility light.

While a number of these various circuits could be made semi-automatic or automatic, it is generally preferable to keep the circuits more or less independent so that the operator of the apparatus has maximum control over the various processing steps of the operation. It is for this reason that the various individual circuits are provided for the re-expose light, the blower, the float actuated pump and the individual heating elements.

Typical chemical solution metering devices 201–205 are illustrated in FIG. 12. The one shown is a commercially available purge meter manufactured by the Fisher and Porter Company of Warminster, Pennsylvania (Model No. 10X3135). Rotation of the needle valve 601 adjusts the rate of flow of a chemical solution flowing out of the tube 336. Details on the operation of this sort of meter can be obtained by referring to the instructional material published by the Fisher and Porter Company.

Figure 14:
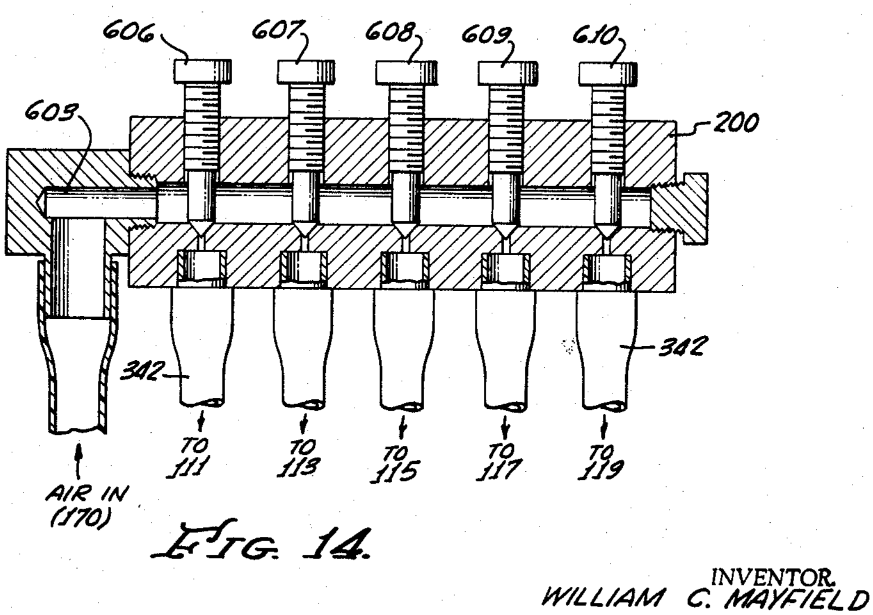
FIG. 14 is a cross section view of the air inlet valves which meter air to the chemical tanks for agitating the chemical solutions.

The air distribution system identified as 190 and including individual air valves 191–195 is illustrated in FIG. 14. It provides a common inlet from the air compressor 170 along a common distribution bar 603 wherein a series of individually threadedly tapered needle valves 606–610 are adjustably arranged to control the rate of flow out of the individual tubes 342 going to the chemical solution tanks 111, 113, 115, 117, and 119, respectively. In some cases, it is necessary to individually adjust the rate of flow of agitating air to the various chemical solution tanks since its magnitude will affect the rate of film developing in the different processing stages. Also, the degree of agitation necessary to keep a given chemical solution thoroughly mixed may not always be the same.

FIG. 13 discloses a typical clamp 561 that may be used on the drain tubes. The illustrated clamp 561 includes a body member 555 apertured transversely at 556 to receive a collapsible drain tube 335 therethrough. An internally threaded sleeve 558 is affixed to the open end of the body member 555 and supports a threaded screw 559 with a rotating knob 560 on its outer end. A clamp ball 562 such as a marble is disposed in the aperture 567 between the collapsible tube 535 and the end of the screw member 599. Upon rotation of the screw member 559, the check ball 562 collapses the side of the tube 335 against the curved lower part 564 of the body member 555 to cut off the flow of chemical solution or water through the tube 335. It is apparent that other types of clamps can be used, but this clamp provides an effective seal of the drain tube, and yet does not permanently deform or kink the rubber tube 335.

I claim:

1. Apparatus for the continuous reverse processing of film comprising, in combination, (a) a frame;

(b) a light tight vertical access accumulator cabinet mounted at one end of said frame;

(c) an adjustable feed loop accumulator rack having a plurality of film rollers mounted in spaced-apart relation thereon, said rack removably mounted in said cabinet in light tight relation;

(d) a magazine bracket attached to said accumulator cabinet to receive a daylight film magazine in light tight relation;

(e) a series of chemical and rinse tanks supported in line on said frame adjacent said accumulator cabinet and containing selected chemicals and rinse water;

(f) each chemical tank being one part of a dual tank having a common conducting wall with a rinse tank;

(g) an adjustable film rack removably mounted in each of said tanks;

(h) individual means operable to meter desired quantities of fresh chemicals to the respective chemical sections of said dual tanks;

(i) a source of pre-selectedly controlled temperature rinse water;

(j) means metering a controlled amount of said rinse water to each of the rinse tanks;

(k) means operable to remove liquids overflowing said tanks;

(l) a light seal form for the dual tanks utilized in the first stage of developing and rinsing including a resilient cushion adjacent the tops of said dual tanks;

(m) a hood adapted to interlock with said light seal form to define a light tight labyrinth for said first stage of film processing;

(n) means for re-exposing the film;

(o) a drier cabinet attached to said frame;

(p) spaced-apart shafts with rollers thereon mounted in said drier cabinet to support film as it is moved through said drier cabinet;

(q) means including an adjustable source of heat to maintain hot air at a selected temperature in said drier cabinet;

(r) means operable to normally drive selected rollers on the film racks and the rollers in said drier cabinet at pre-selected processing speed;

(s) a reversible take-up reel assembly mounted adjacent the film exit on said drier cabinet; and, (t) means associated with a shaft and film spool in said drier cabinet and independent of said take-up reel assembly to maintain a constant over-pull on the film being processed so that a take-up reel may be changed without interfering with the movement of film through the processing apparatus.

2. Apparatus for the continuous reversal processing of film in accordance with claim 1 wherein (a) the accumulator cabinet has an entrance opening formed therein adjacent the magazine bracket and an exit into the light tight labyrinth; and, (b) the feed loop rack includes film rollers mounted on spaced-apart parallel shafts, the shafts being mounted on a frame attached to the underside of the cover of the accumulator cabinet and the lower shaft being supported for movement along the sides of the accumulator frame to permit the film capacity of the accumulator rack to vary; and including, (c) a rod attached to the lower shaft support of the feed loop rack and projecting out of the accumulator cover to indicate the position of the lower shaft in the cabinet.

3. Apparatus for the continuous reversal processing of film in accordance with claim 1 wherein the adjustable film rack in each tank is rectangularly shaped, has an upper shaft rotatably mounting a plurality of film rollers and a vertically displaceable lower shaft mounting a plurality of rollers, includes means to retain the film on said lower rollers, and means to move the lower shaft vertically to vary the film capacity of the rack.

4. Apparatus for the continuous reversal processing of film comprising, in combination, (a) a frame;

(b) a light tight vertical access accumulator cabinet mounted at one end of said frame;

(c) an adjustable feed loop rack having a plurality of film rollers mounted in spaced-apart relation thereon, said rack removably mounted in said cabinet in light tight relation;

(d) a light tight bracket attached to said accumulator cabinet to receive a daylight film magazine in light tight relation;

(e) a series of chemical and rinse tanks supported in line on said frame adjacent said accumulator cabinet and containing selectively chemicals or rinse water;

(f) each chemical tank being one part of a dual tank having a common conducting wall with a rinse tank;

(g) an apertured bar removably threaded into each tank to permit the liquid therein to be mixed by agitation;

(h) an adjustable film rack removably mounted in each of said tanks;

(i) each of said racks having a plurality of film rollers mounted on parallel shafts adjustably spaced apart to pre-set the film capacity of each rack;

(j) sources of the chemicals required to reversal develop film;

(k) individual means operable to meter desired replenishment quantities of said chemical sources to the respective chemical sections of said dual tanks;

(l) means connected to the agitator bar of said chemical tanks operable to introduce selected quantities of air therein so as to agitate the chemicals therein;

(m) a source of rinse water of pre-selected temperature;

(n) means metering equal amounts of said water through the apertured mixing bars mounted in each of the rinse tanks to maintain the water therein fresh;

(o) means including a reservoir to collect and discharge the overflow liquid from said chemical and wash tanks;

(p) a light seal form for the dual tanks utilized in the first stage of developing and rinsing including a poured resilient cushion adjacent the tops of said dual tanks, a splash shield mounted on said frame and one side of said accumulator cabinet;

(q) a hood adapted to interlock with said light seal form to define a light tight labyrinth for the first stage of film processing;

(r) a re-exposure light mounted on said frame adjacent the film exit from said hood;

(s) a drier cabinet mounted at the other end of said frame;

(t) a pair of film loop trees having spaced-apart shafts with rollers thereon mounted in said drier cabinet to support film as it moves through said drier cabinet;

(u) means including the heat from the electrical equipment of the apparatus, an adjustable source of heat and internal baffles to maintain air at a selected temperture in said drier cabinet;

(v) an air squeegee for said film supported on said drier cabinet following said last rinse tank;

(w) means including individually adjustable clutches operable to drive the upper rollers on said film racks and the film loop trees in said drier cabinet at pre-selected processing speeds;

(x) an adjustable take-up reel assembly affixed to said drier cabinet adjacent the film exit thereof;

(y) reversible means operable to drive said take-up reel assembly in a desired direction; and, (z) means associated with a film loop tree of said drier cabinet but independent of said take-up reel assembly to maintain a constant over-pull on the film being processed so that a take-up reel may be changed without interfering with the movement of film through the processing apparatus.

5. In apparatus for continuously processing film, the improvement in processing tank modules comprising, in combination, (a) a two section, open top processing tank formed of two rectangularly shaped flanged shells bonded together with a thin conducting sheet of stainless steel therebetween for use as chemical and rinse tanks, respectively;

(b) open support saddles affixed to opposite edges of each section of said tank adjacent the open top thereof;

(c) an overflow aperture formed in each section of said tank toward the upper ends thereof;

(d) openings formed in the bottom of each of said tank sections to permit the tank sections to be replenished or drained;

(e) an agitator bar having perforations therein threadedly inserted in each of said sections adjacent the bottom thereof to permit the chemical in the one section to be agitated with air and the rinse water in the other section to be agitated with replenishing fresh water;

(f) a rectangularly shaped film rack adapted to be disposed in each section of said two-section tank;

(g) each of said racks having an upper shaft with a plurality of film rollers affixed thereto rotatably mounted in spaced-apart bearing blocks to form its upper end, a pair of spaced-apart guide members forming its sides and a spacer bar between the lower ends of said guide members forming its lower end;

(h) said spacer bar proportioned to cooperate with the interior of a tank section to stabilize the rack when it is disposed interior thereof;

(i) said bearing blocks having bushings extending outwardly at each end beyond the sides of said rack to rest in said open support saddles when a film rack is disposed interior of its tank section;

(j) a lower shaft assembly including a pair of support blocks slideably mounted on the sides of said rack;

(k) a pair of shafts mounted in spaced-apart vertical relation between said support blocks and in parallel relation to said upper shaft;

(l) the upper one of said pair of shafts freely rotatably mounting a plurality of film rollers and the other of said pair of shafts mounting a plurality of keeper rollers in line with said film rollers and immediately adjacent thereto to retain film on said lower film rollers;

(m) a vertical indicator rod slideably journaled through one of said bearing blocks for attachment at its lower end to said lower shaft assembly whereby the vertical position of said lower shaft assembly in the tank section can be varied;

(n) means associated with the journaled bearing block operable to lock the indicator rod in a selected vertical position; and (o) drive means including an adjustable slip clutch connected to said upper shaft when the rack is disposed in a tank section operable to drive the upper film rollers of said rack at a selected speed.

References Cited

UNITED STATES PATENTS

| | | | |
|---|---|---|---|
| 1,533,546 | 4/1925 | Hall | 352—242 |
| 1,666,999 | 4/1928 | Garbutt et al. | 95—94 |
| 2,837,988 | 6/1958 | Pavelle | 95—89 |
| 2,912,915 | 11/1959 | Hiserman | 95—94 |
| 3,087,405 | 4/1963 | Sachs et al. | 95—94 |
| 3,261,278 | 7/1966 | Jiruska | 95—94 |

FOREIGN PATENTS 909,788 11/1962 Great Britain.

NORTON ANSHER, *Primary Examiner.*

FRED L. BRAUN, *Assistant Examiner.*